(12) United States Patent
Kato

(10) Patent No.: US 6,462,738 B1
(45) Date of Patent: Oct. 8, 2002

(54) CURVED SURFACE RECONSTRUCTION

(75) Inventor: Saul S. Kato, San Francisco, CA (US)

(73) Assignee: Spatial Technology, Inc., San Francisco, CA (US)

( * ) Notice: Subject to any disclaimer, the term of this patent is extended or adjusted under 35 U.S.C. 154(b) by 0 days.

(21) Appl. No.: 09/466,540

(22) Filed: Dec. 17, 1999

Related U.S. Application Data

(60) Provisional application No. 60/131,188, filed on Apr. 26, 1999.

(51) Int. Cl.[7] .................................................. G06T 11/00
(52) U.S. Cl. ......................................................... 345/428
(58) Field of Search ................................ 345/428, 442, 345/582, 588

(56) References Cited

U.S. PATENT DOCUMENTS

| | | | | |
|---|---|---|---|---|
| 5,602,979 A | * | 2/1997 | Loop ........................... | 395/123 |
| 6,201,881 B1 | | 3/2001 | Masuda et al. ............. | 382/100 |
| 6,222,553 B1 | * | 4/2001 | DeRose et al. ............. | 345/423 |

FOREIGN PATENT DOCUMENTS

| | | | | |
|---|---|---|---|---|
| EP | 0 996 094 A1 | 4/2000 | ........... | G06T/17/00 |
| JP | 63-83871 | 4/1988 | ........... | G06F/15/60 |

* cited by examiner

Primary Examiner—Jeffery Brier
Assistant Examiner—G. F. Cunningham
(74) Attorney, Agent, or Firm—Fenwick & West LLP

(57) ABSTRACT

A control mesh of polygonal approximations is generated from one of a variety of conventional object representation schemes. The control mesh is a uniform representation of the object to be rendered comprising edge information and reconstruction data for the polygons comprising the control mesh. Reconstruction data includes surface normal data, and surface hint data. Surface hint data includes information regarding whether a vertex is a sharp point, or whether an edge should be represented as a hard edge. Resolution levels are calculated for all of the vertices of all of the polygons in the control mesh. Resolution levels specify the appropriate level of resolution for a triangle or other polygon responsive to the topology of the object and the camera angle currently being used in the application. Responsive to calculating the resolution levels, the polygons are subdivided responsive to the resolution levels. A data structure is maintained that provides the appropriate subdivision methodology to be used for all cases of T-vertices. After subdivision, locations for the vertices of the new polygons are calculated. If the polygons being generated are triangles, Bezier triangles are used in place of the original triangles to provide a surface rendering that has a greater level of control. The parameters for the Bezier triangles are calculated from the known vertices of the triangles, and the reconstruction data, to provide a detailed, realistic representation of the object.

24 Claims, 20 Drawing Sheets

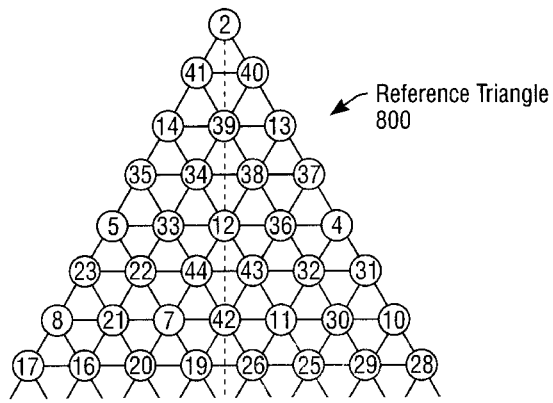
Reference Triangle 800
Title: Curved Surface Reconstruction with Subdivision Patterns and Adaptive Resolution
Inventor: Saul S. Kato
Atty. Docket No.: 21434-04591
Serial No. 09/446,540
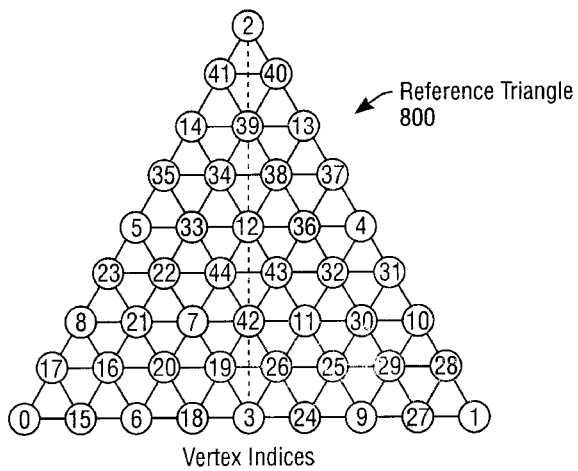
Reference Triangle 800
Vertex Indices
FIGURE 8C
FIGURE 8D
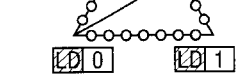

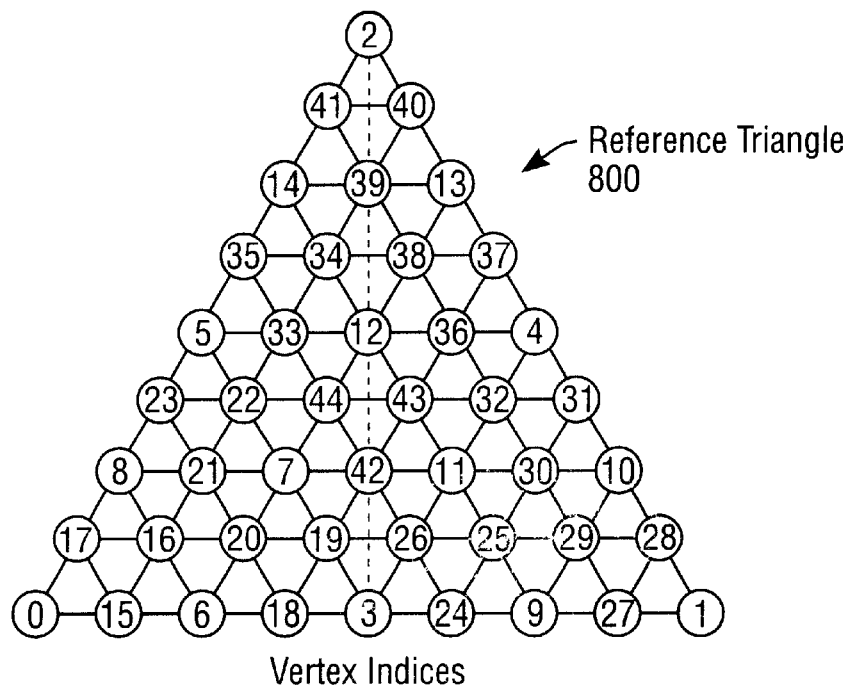
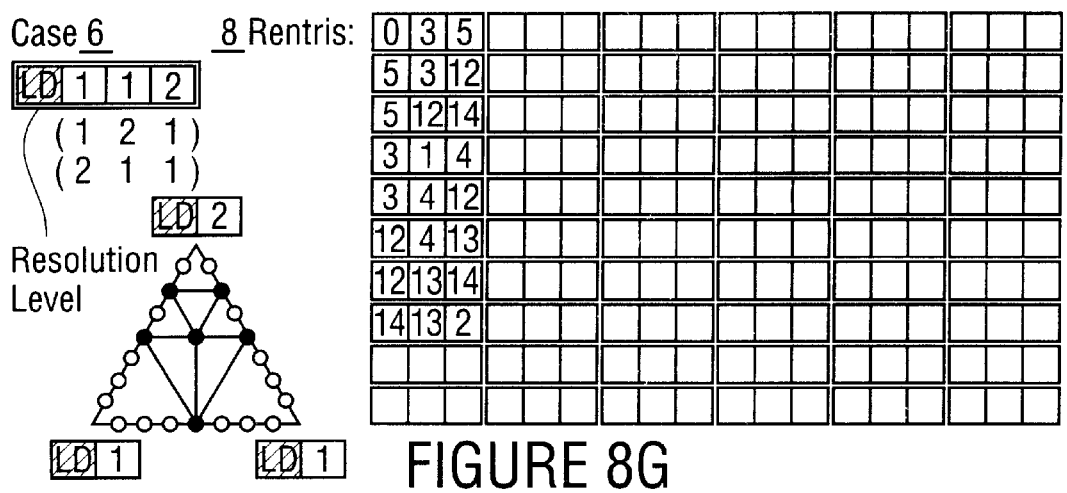
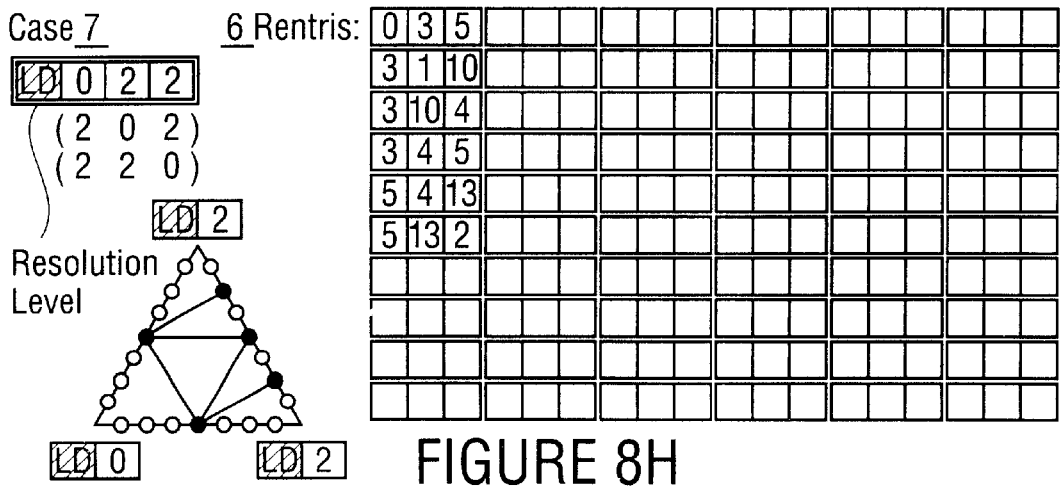

Reference Triangle 800

Vertex Indices

Reference Triangle 800

Vertex Indices

Reference Triangle 800

Vertex Indices

Case 12     12 Rentris:

| 0 | 3 | 5 | 39 | 40 | 41 |
| 5 | 3 | 12 | 41 | 40 | 2 |
| 5 | 12 | 14 | | | |
| 14 | 12 | 39 | | | |
| 14 | 39 | 41 | | | |
| 3 | 1 | 4 | | | |
| 3 | 4 | 12 | | | |
| 12 | 4 | 13 | | | |
| 12 | 13 | 39 | | | |
| 39 | 13 | 40 | | | |

Case 13     22 Rentris:

| 0 | 3 | 5 | 34 | 38 | 39 | 39 | 40 | 41 |
| 5 | 3 | 12 | 34 | 39 | 14 | 41 | 40 | 2 |
| 5 | 12 | 34 | 14 | 39 | 41 | | | |
| 5 | 34 | 14 | 11 | 10 | 4 | | | |
| 3 | 1 | 10 | 11 | 4 | 36 | | | |
| 3 | 10 | 11 | 36 | 4 | 37 | | | |
| 3 | 11 | 12 | 36 | 37 | 38 | | | |
| 12 | 11 | 36 | 38 | 37 | 13 | | | |
| 12 | 36 | 38 | 39 | 38 | 13 | | | |
| 34 | 12 | 38 | 39 | 13 | 40 | | | |

Reference Triangle 800

Vertex Indices

Reference Triangle 800

Vertex Indices

Reference Triangle 800

Vertex Indices $n_0$ = Normal of Endpoint at Tail of Edge
$n_1$ = Normal of Endpoint at Head of Edge $$t_0 = (\hat{n}_0 \times e_0) \times \hat{n}_0 \quad \text{—} \quad 1005$$

$$t_1 = (\hat{n}_1 \times e_0) \times \hat{n}_1 \quad \text{—} \quad 1006$$

CURVED SURFACE RECONSTRUCTION

CROSS-REFERENCE TO RELATED APPLICATION

This application is related to provisional patent application Serial No. 60/131,188, filed Apr. 26, 1999 entitled "Curved Surface Rendering" from which priority is claimed under 35 U.S.C. §119(e).

BACKGROUND OF THE INVENTION

1. Field of the Invention

The present invention relates generally to the field of computer graphics, in particular to systems and method for generating and rendering images in three-dimensional graphics. More particularly, the present invention relates to a system and method for generating three-dimensional objects to be rendered by a graphics subsystem.

2. Description of the Background Art

Rendering systems generate representations of objects using polygonal approximations. The level of detail and realism achieved in a 3D-representation is directly related to the number of polygons used to represent the object. However, objects having a large number of polygons are resource-intensive to process. Therefore, many conventional systems limit the number of polygons used to represent objects. In these systems, when the camera zooms closer to objects, the objects appear blocky, and lose their smooth edges. Additionally, in prior art systems, polygons are generated from mathematical surfaces by recursive subdivision. Thus, polygons of an object are subdivided with successive passes to produce a higher number of polygons and to eliminate any known artifacts caused by the subdivision. This process is also resource-intensive, and requires a longer processing cycle. Thus, a system, method, and apparatus is needed that dynamically adds detail to objects when more detail would be perceived by a human eye, and uses less detail when and where less detail is required, to optimize the appearance of 3D objects without wasting processing power. Additionally, a system, method, and apparatus are needed that eliminates recursive passing but still creates smooth accurate surfaces and eliminates artifacts generated by subdivision.

SUMMARY OF THE INVENTION

A system, method, and apparatus are provided to adaptively determine the amount and nature of polygons to be used to render objects in a 3D-environment. First, a control mesh of polygonal approximations is generated from one of a variety of conventional object representation schemes. The control mesh is a uniform representation of the object to be rendered comprising edge information and reconstruction data for the polygons comprising the control mesh. Reconstruction data includes surface normal data, and surface hint data. Surface hint data includes information regarding whether a vertex is a sharp point, or whether an edge should be represented as a hard edge. Next, resolution levels are calculated for all of the vertices of all polygons in the control mesh. Resolution levels specify the appropriate level of resolution for a triangle or other polygon responsive to the topology of the object and the camera angle currently being used in the application. Polygons representing areas of an object that are being viewed by the camera at an angle that reveals edges of the object are given higher resolution levels. However, polygons representing areas of an object that are being viewed by a camera at an angle that obscures edge information, for example, if the camera is viewing the area directly, are given lower resolution levels. Thus, the resolution of the object is dynamically, locally, and adaptively determined to provide higher levels of detail where detail is most apparent to the human eye, and less detail when detail would be unnoticed.

Responsive to calculating the resolution levels, the polygons are subdivided responsive to the resolution levels. However, conventional subdivision methodologies require multiple heuristic sweeps to identify and remedy any cracks or artifacts generated when two polygons share edges that are not subdivided identically (T-vertices). This known problem is addressed in conventional systems by repetitive analysis and correction that is resource-intensive and inefficient. However, in accordance with the present invention, a data structure is maintained that provides the appropriate subdivision methodology to be used for all cases of T-vertices caused by subdivision junctures of differing resolution. The data structure allows the processing to occur rapidly, effectively, and ensures that no cracks or artifacts will occur during subdivision. Thus, no repetitive looping or branching is required to identify cracks or artifacts in accordance with the present invention.

After subdivision, locations for the vertices of the new polygons are calculated. In accordance with the present invention, where the polygons being generated are triangles, Bezier triangular patches are used in place of the original triangles to provide a curved surface rendering that has a greater level of control. The parameters for the Bezier triangles are calculated from the known vertices and vertex attributes of the triangles, and the reconstruction data, to provide a detailed, realistic representation of the object. Thus, in accordance with a further embodiment of the present invention, additional detail can be added to an object from an original control mesh. In systems where polygonal approximations are received as an input, the added detail is new detail not present in the original object, thus providing for a rendered object that has more detail than the original. For other types of input, the final product is a very close approximation of the original surface. However, as the detail is added adaptively, the amount of detail is added as necessary to provide the most accurate image without wasting resources.

DETAILED DESCRIPTION OF THE PREFERRED EMBODIMENTS

Figure 1:
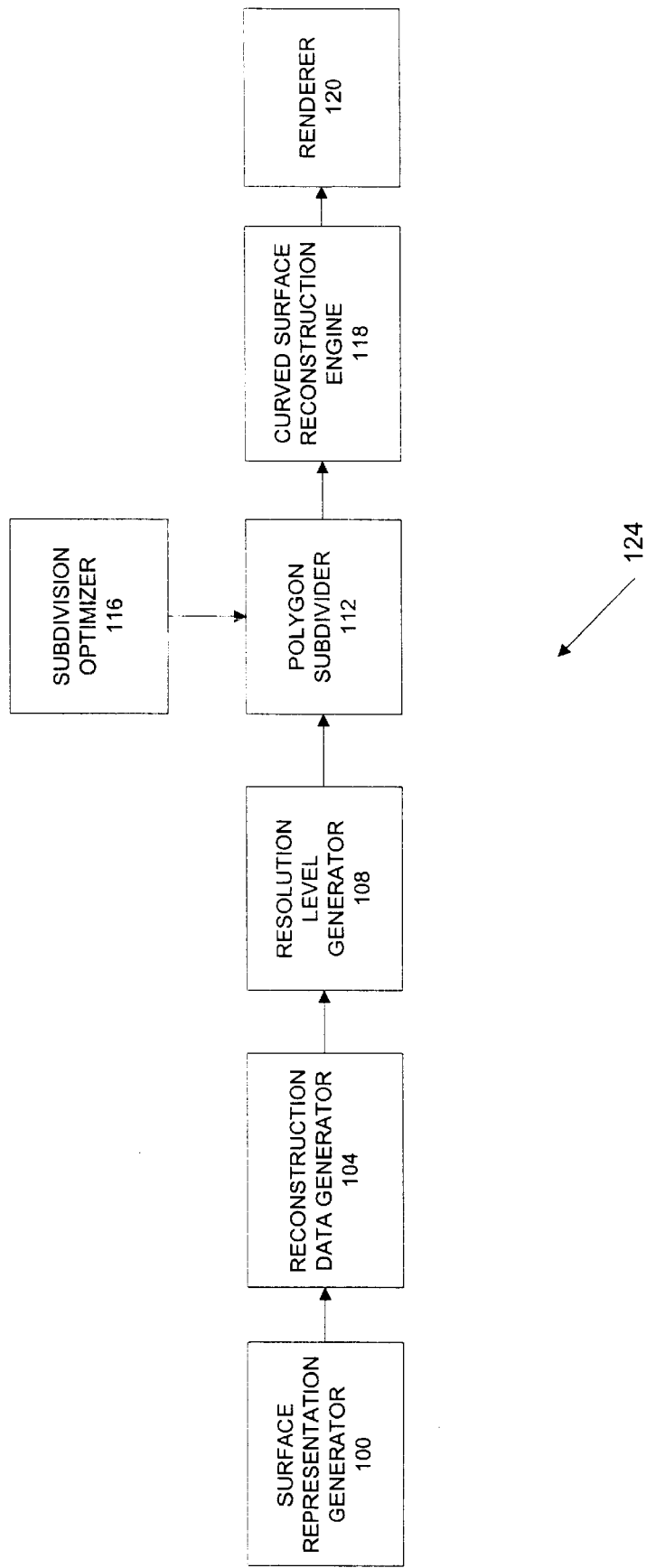
FIG. 1 is a block diagram illustrating processing modules for providing curved surface reconstruction in accordance with the present invention.

FIG. 1 is a block diagram illustrating processing modules for providing curved surface reconstruction in accordance with the present invention. As described below, the processing in accordance with the present invention can be executed by application-specific integrated circuits, by general-purpose processors, or any other known method of implementation of sequenced instructions. The methodology of the present invention is especially advantageous for implementation as ASICs, as the methodology does not require branch instructions that would otherwise complicate an ASIC implementation. FIG. 1 illustrates a graphics subsystem 124, in which a surface representation generator 100 generates an object to be displayed on a computer display. The surface representation generator 100 can be any conventional source for three-dimensional objects to be used in CAD applications, gaming applications, or the like. Surface representations may include boundary representations, non-uniform rational b-splines, polygonal approximations, primitives, analytics, or procedural objects. As can be seen, any representational format may be used in accordance with the present invention. Herein, the object to be analyzed is described as comprising a series of triangles, but this description is exemplary is not intended to limit the application of the present invention to triangle-based graphics systems.

Figure 2:
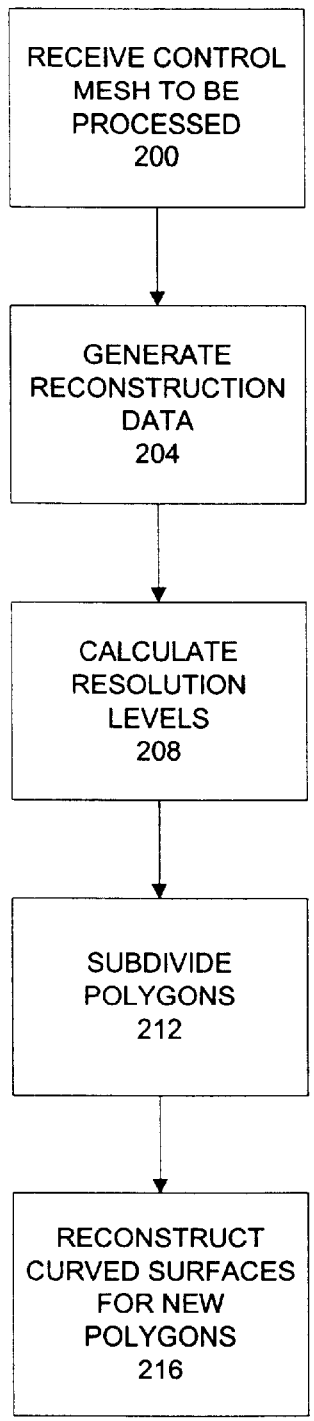
FIG. 2 is a flowchart illustrating a method of reconstructing curved surfaces in accordance with the present invention.
Figure 3:
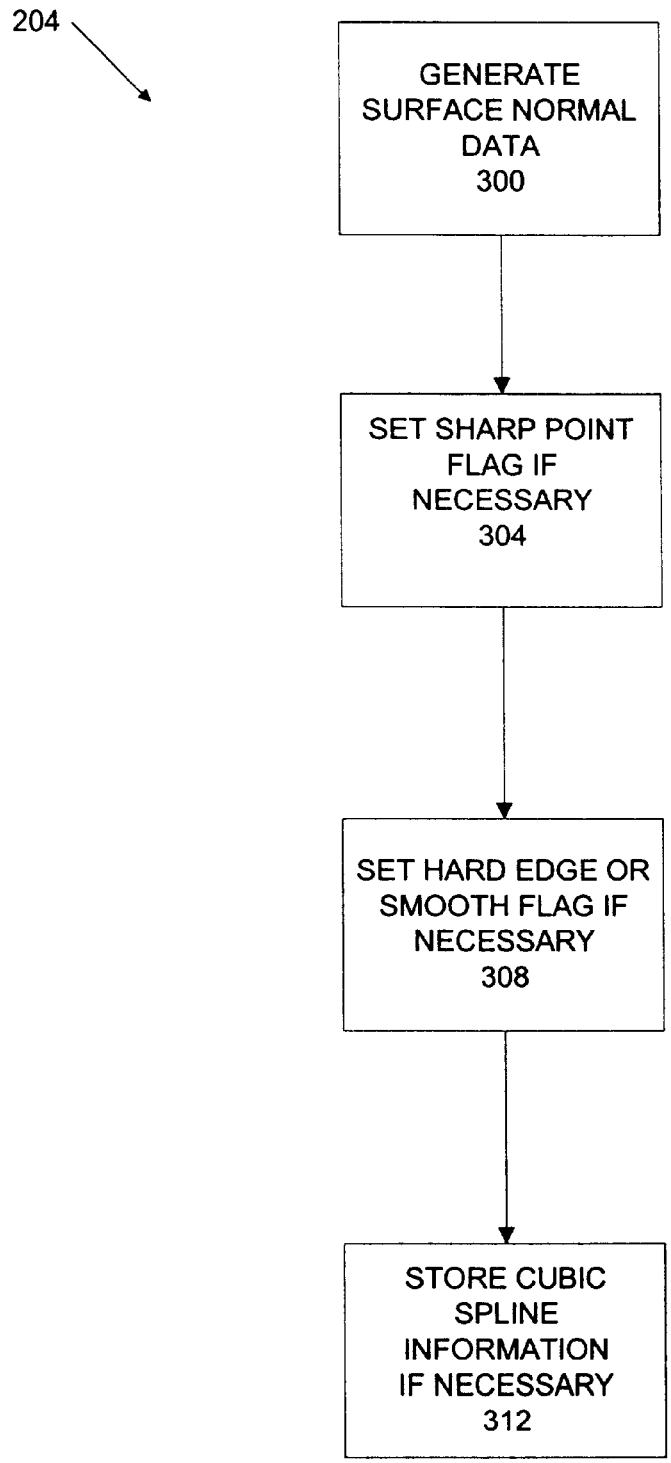
FIG. 3 is a flowchart illustrating a method of generating reconstruction data in accordance with the present invention.

Next, a reconstruction data generator 104 converts the surface representation to a uniform representation. This is preferably accomplished by casting the surface representation into a control mesh. To generate a control mesh from the surface representation, known tessellation techniques are used to extract the polygon data from the surface representation. FIG. 2 is a flowchart illustrating a method of reconstructing curved surfaces in accordance with the present invention, and will be described in conjunction with FIG. 1. In accordance with the present invention, after a control mesh is received 200, reconstruction data is generated 204 from the tessellation data by the reconstruction data generator 104. Reconstruction data is data used in accordance with the present invention for reconstructing curved surfaces, and is therefore maintained in memory associated with the reconstruction data generator 104 or centralized memory located elsewhere (not shown). The reconstruction data is additional to the polygon data typically contained in a control mesh. For example, in one embodiment of the present invention, as shown in FIG. 3, surface normal data for the polygons are generated 300. Additionally, surface hint data are stored, which indicate characteristics about the surface comprising the polygons. In one embodiment, surface hint data includes edge data, sharpness data, and cubic spline data. In this embodiment, if the polygon represents a surface that has a sharp point, a flag is set 304 to maintain that information for later reconstruction. Also, if a surface has a hard edge, a flag (called a hard edge flag) is set 308 to maintain this information. If an edge is smooth, a smooth flag is set. Cubic spline information is stored 312 for each original polygon edge to capture the curvature of a surface. Cubic spline information is preferably maintained by storing a head and tail tangent vector to be used to recreate the cubic spline via its Hermite representation. These Hermite cubic splines along each edge are then used to generate a Bezier triangular patch for each original polygon. The use of reconstruction data enables the reconstruction of an accurate representation of the original surface. Other data provided in tessellation information can also be extracted to provide reconstruction information in accordance with the present invention.

Figure 8A:
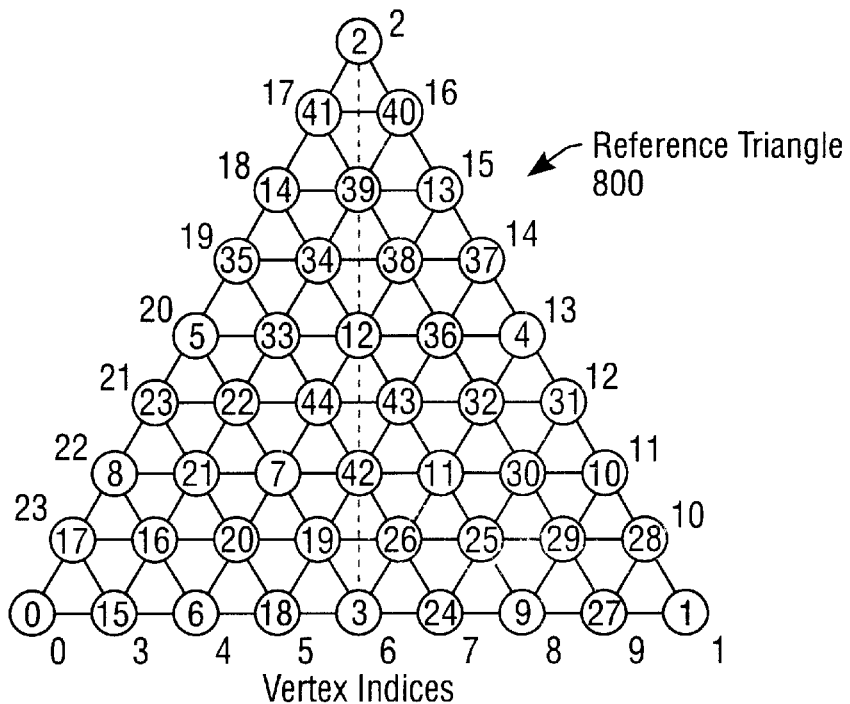
FIGS. 8a–8t are diagrams of subdivision patterns for eliminating T-vertices in accordance with the present invention.
Figure 8A:
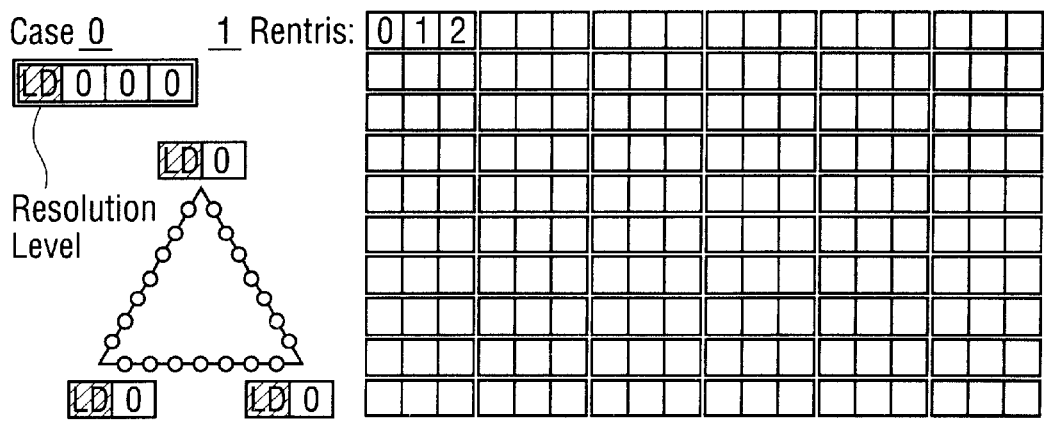
Figure 8B:
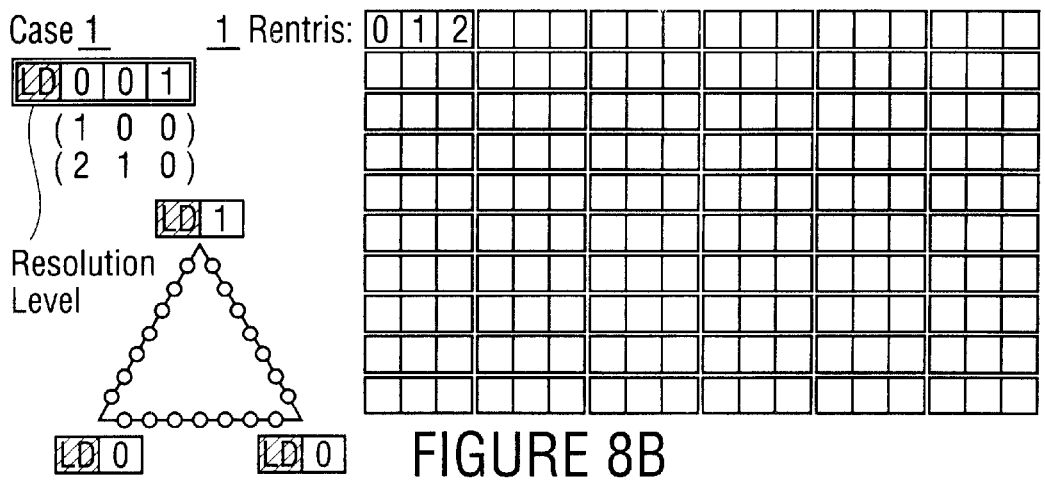
Figure 8E:
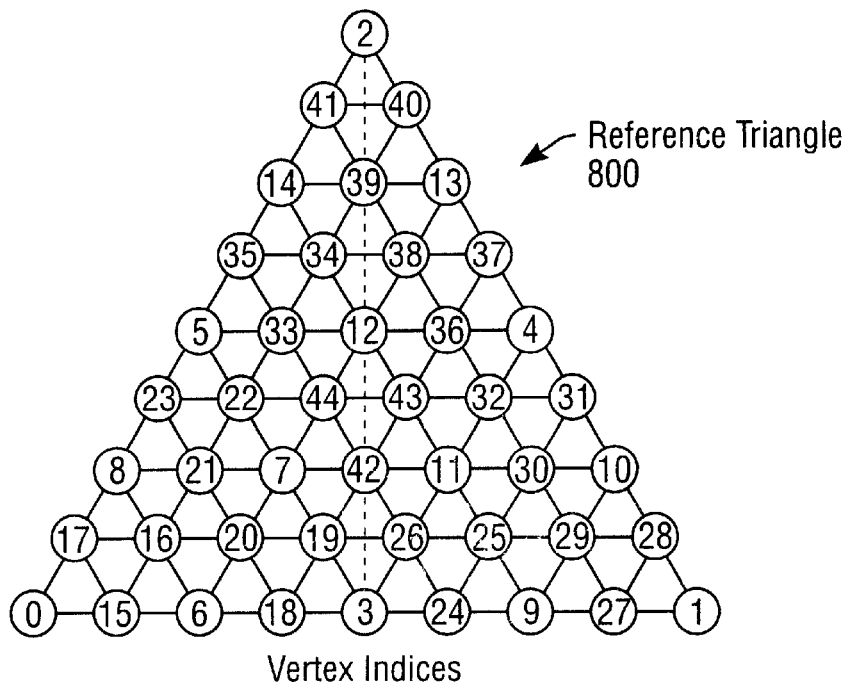
Figure 8E:
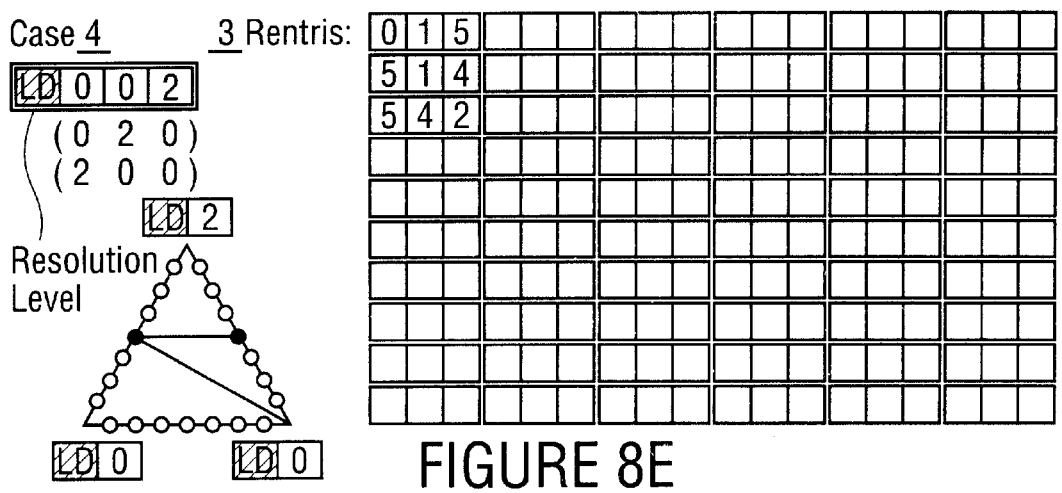
Figure 8F:
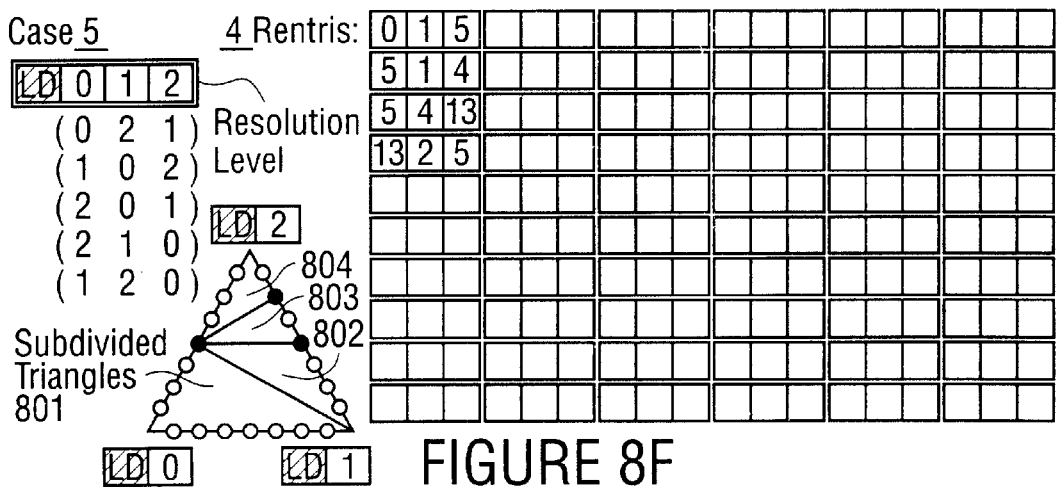
Figure 8I:
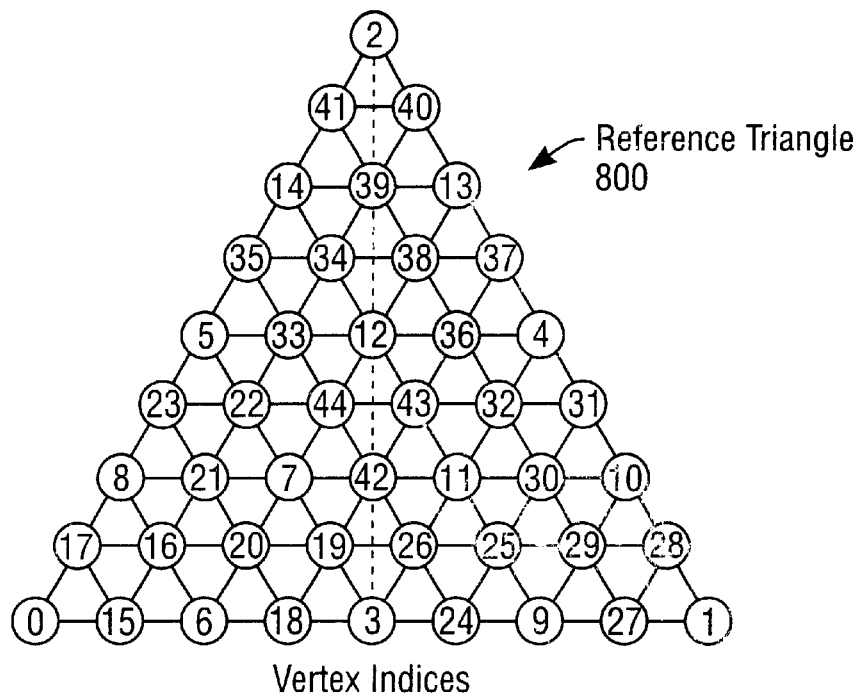
Figure 8I:
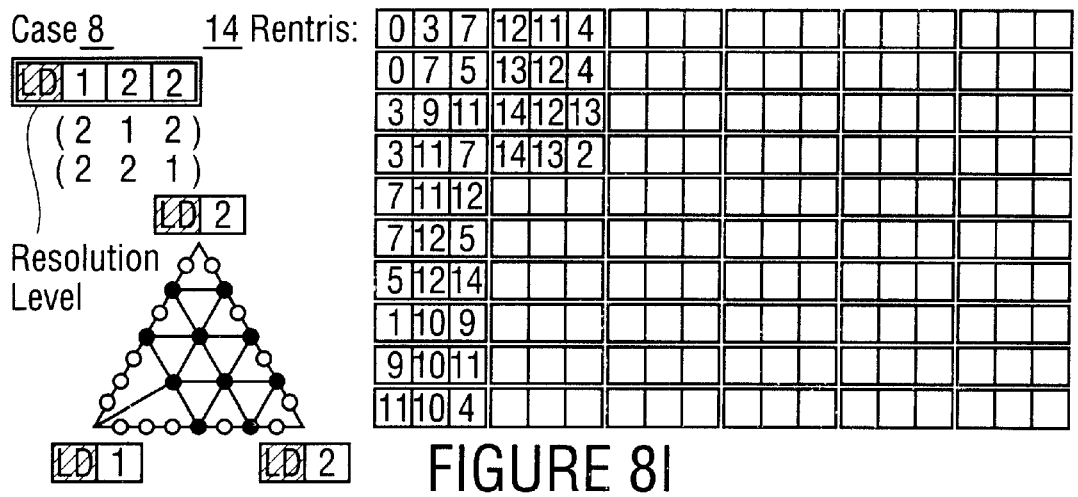
Figure 8J:
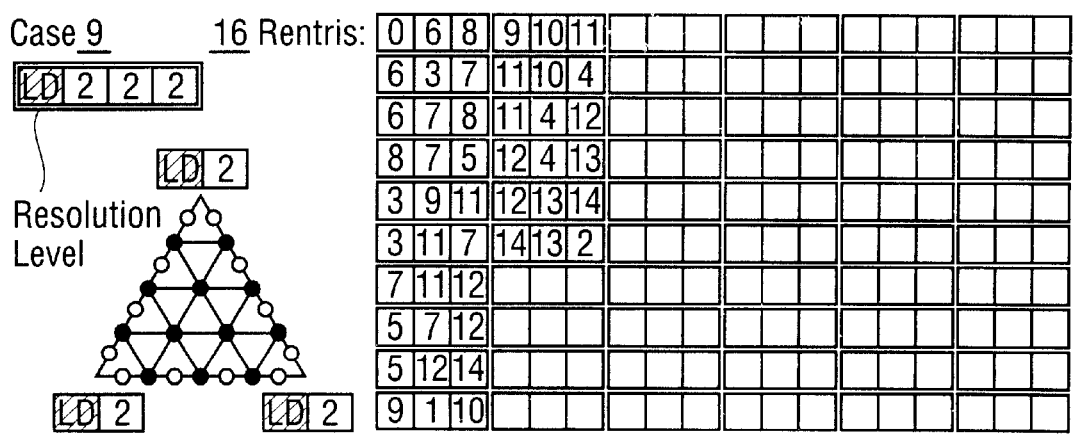
Figure 8K:
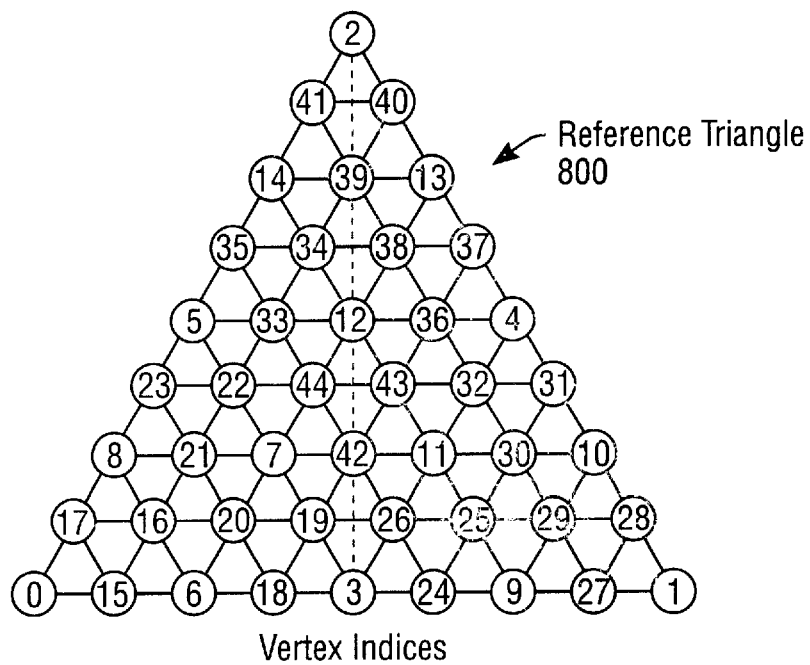
Figure 8K:
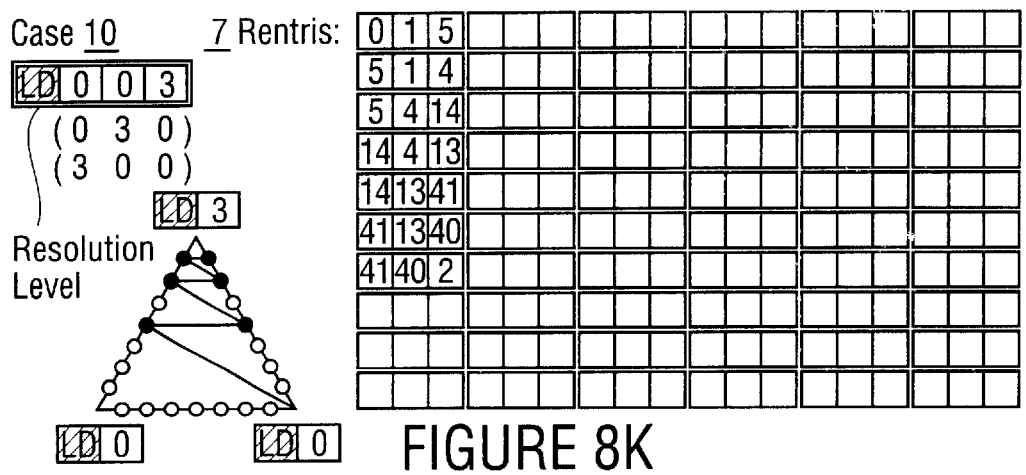
Figure 8L:
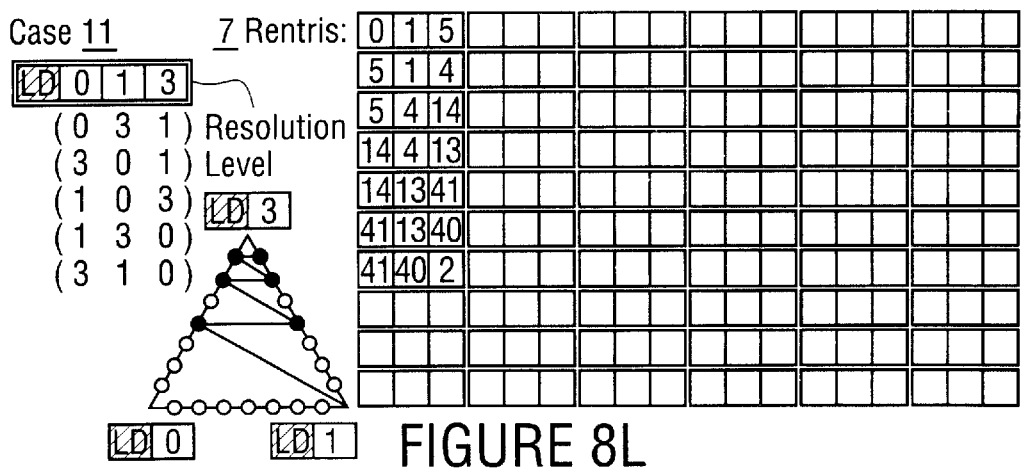
Figure 8M:
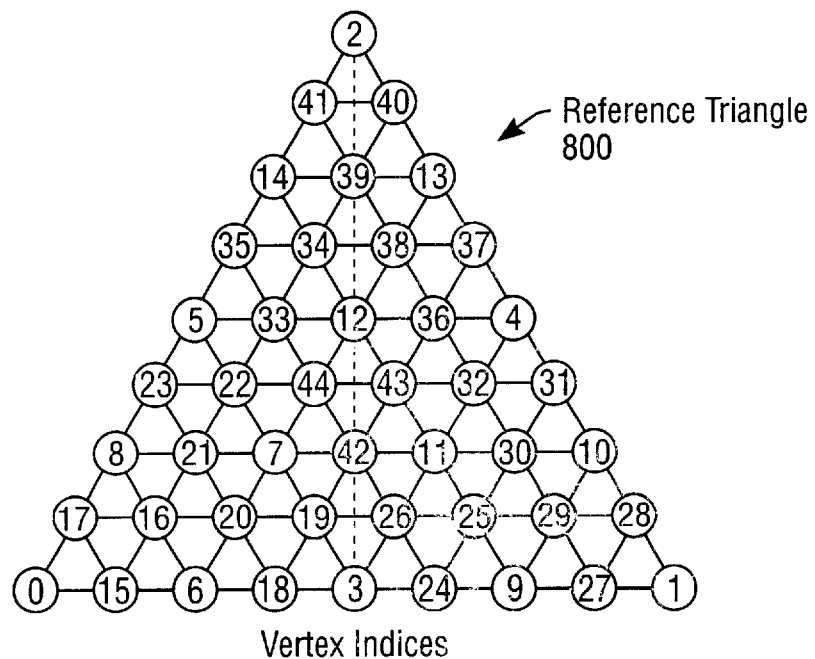
Figure 8M:
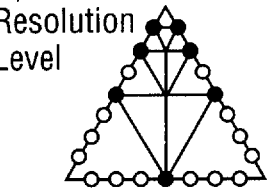
Figure 8N:
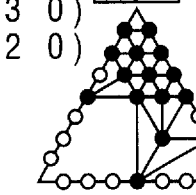
Figure 8O:
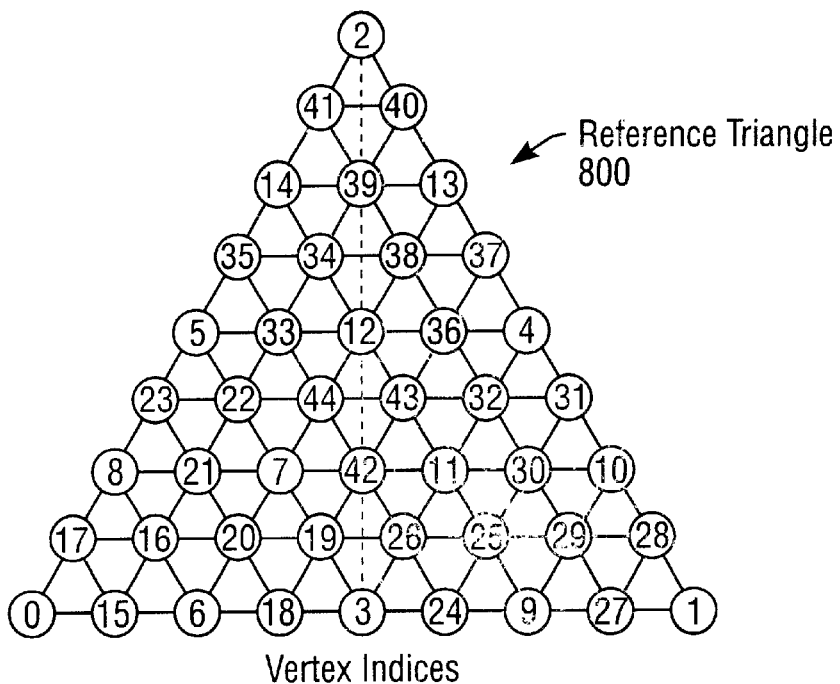
Figure 8O:
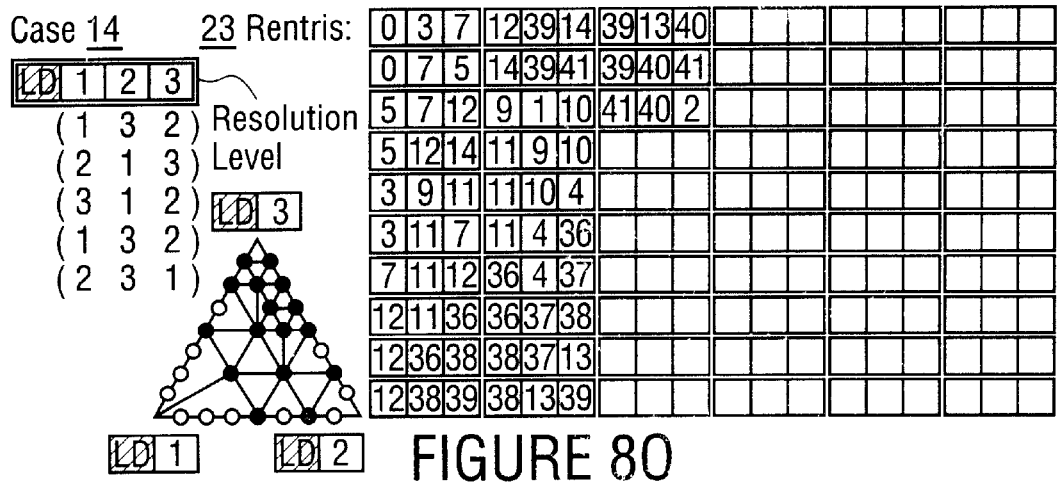
Figure 8P:
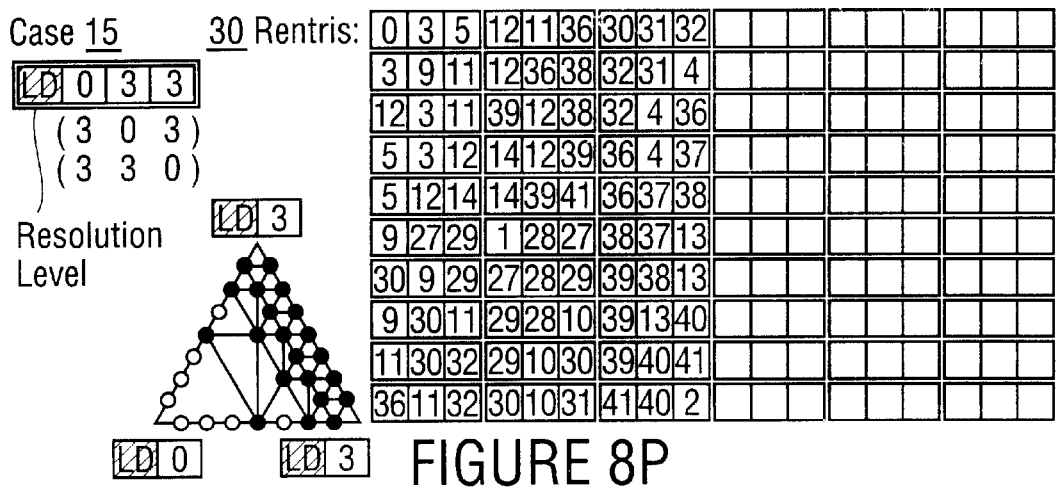
Figure 8Q:
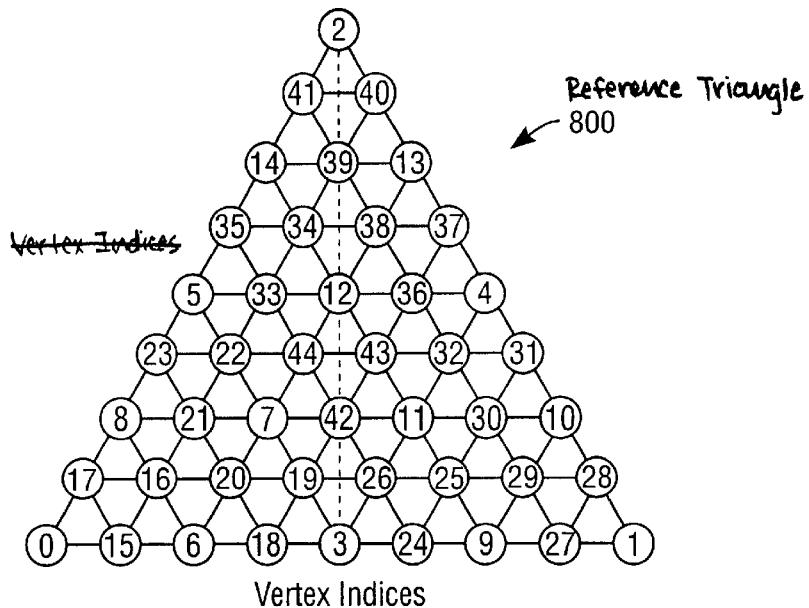
Figure 8Q:
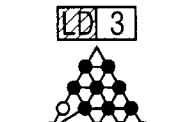
Figure 8R:
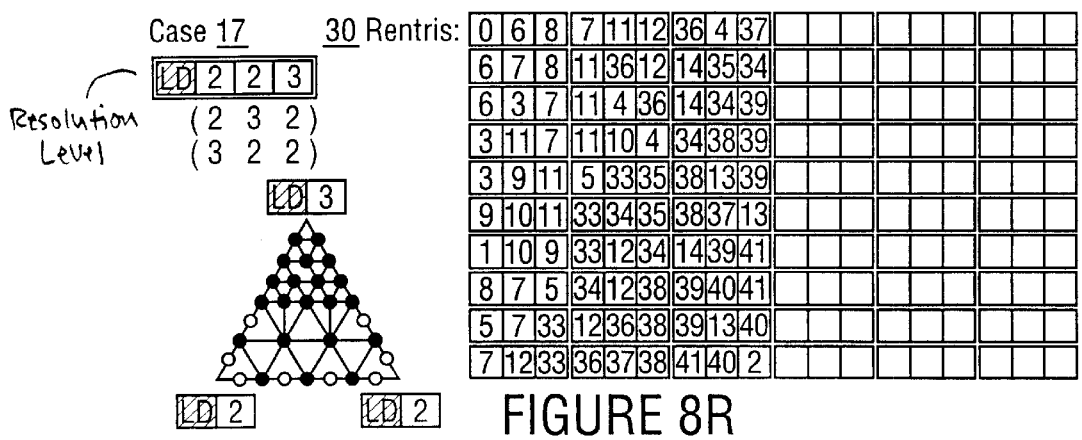
Figure 8S:
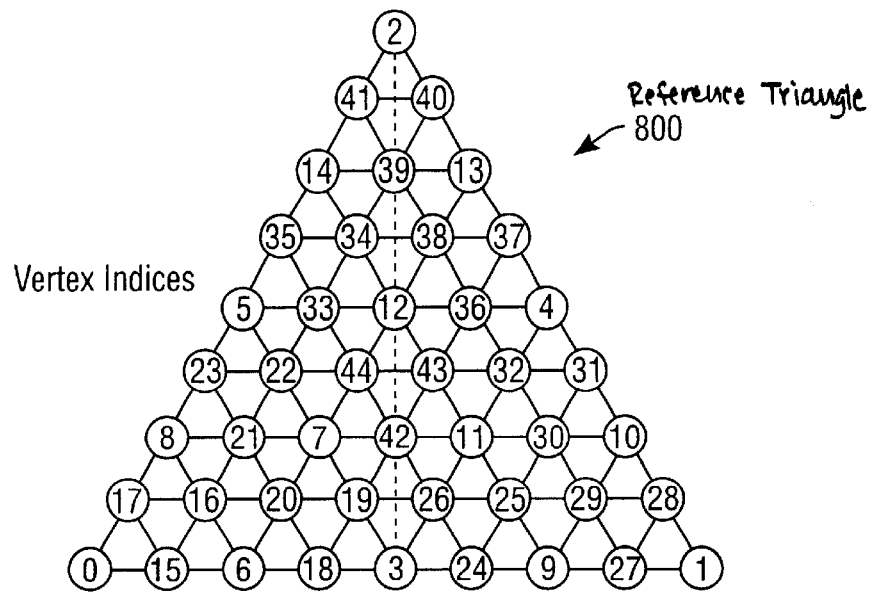
Figure 8S:
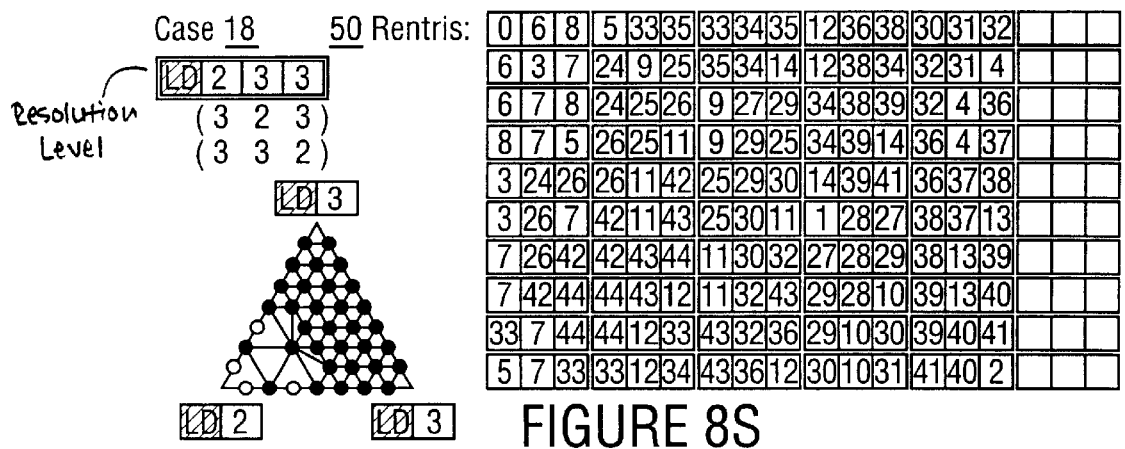
Figure 8T:
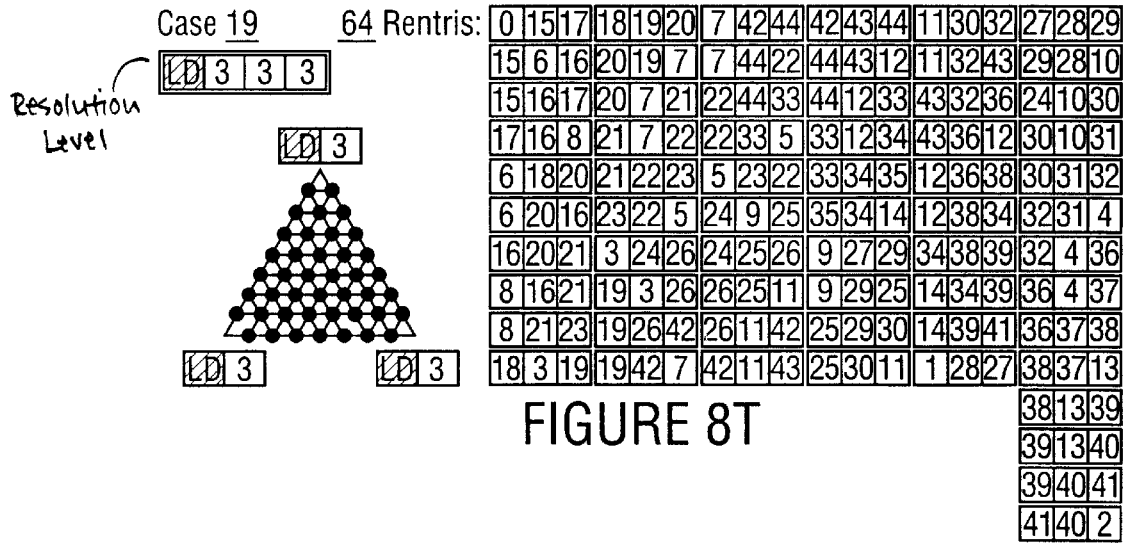

Next, a resolution level generator 108 receives the control mesh and reconstruction data to calculate vertex-specific resolution levels for each polygon. Resolution levels determine whether and how much a polygon is subdivided. Subdividing a polygon provides higher resolution, as a subdivided polygon appears more smoothly curved and appears to have more detail upon rendering than a polygon that is not subdivided. A vertex-specific resolution level allows subdivision to occur precisely where it is needed. In contrast, conventional systems do not provide vertex-specific resolution levels, and thus do not tailor subdivision to those polygons that require it most. In accordance with the present invention, resolution levels may take four values, 0 (no subdivision), 1 (subdivide once), 2 (subdivide twice), and 3 (subdivide three times). For example, in FIG. 8a, resolution levels of all three vertices are 0. Therefore, the polygon (in this case, a triangle) is not subdivided. In FIG. 8d, all three vertices have a resolution level of 1. Accordingly, the polygon is subdivided once into four smaller triangles, providing greater detail and curvature than the original triangle. In FIG. 8j, the vertices are specified at a resolution level of 2. Thus, the polygon is subdivided twice to provide 16 triangles from the original triangle. FIG. 8t has vertices specified at a resolution level of 3. Accordingly, the original polygon is subdivided three times, to generate 64 triangles. This subdivision provides the greatest amount of resolution, and is selected for surfaces that are very curved, and are positioned obliquely with respect to the camera direction, as discussed in more detail below. Thus, specifying the resolution levels of the vertices controls the amount of subdivision provided to a polygon, and therefore allows dynamic control over the amount of detail assigned to different components of an object.

Figure 4A:
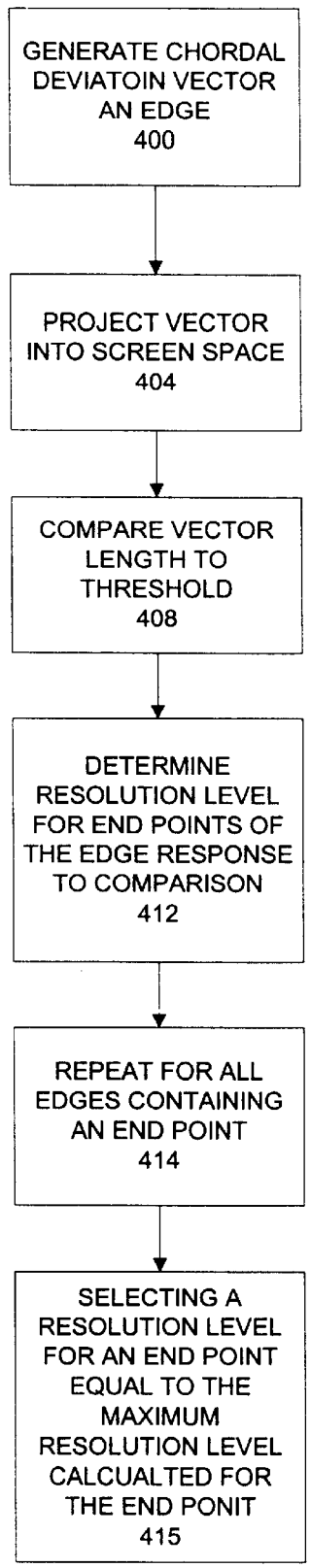
FIG. 4a is a flowchart illustrating a method of calculating resolution levels in accordance with the present invention.
Figure 4B:
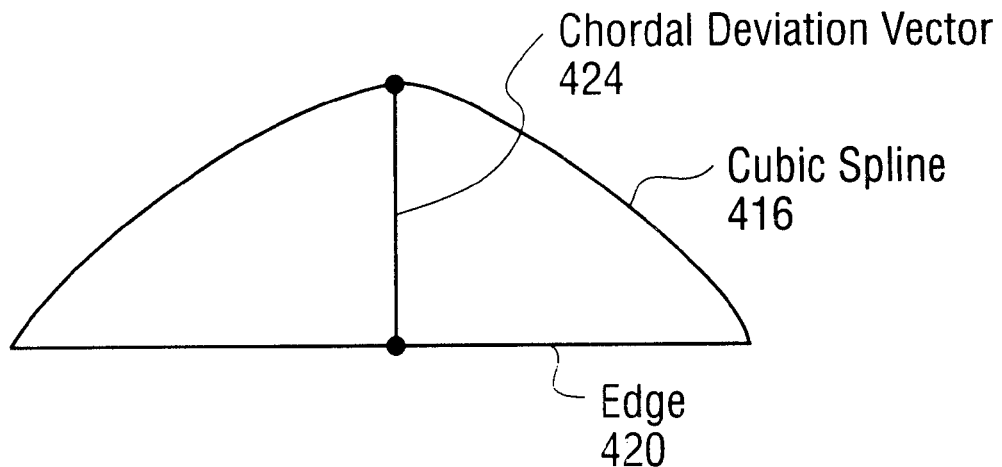
FIG. 4b is a diagram illustrating a vector representing an edge chordal deviation in accordance with the present invention.
Figure 4C:
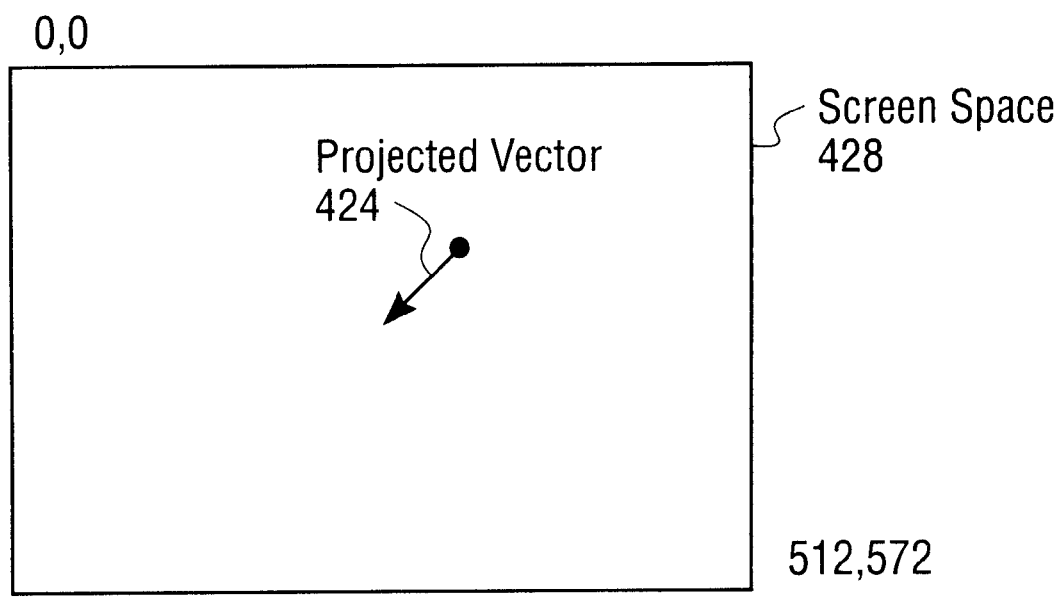
FIG. 4c is a diagram of a projected vector in screen space.

To calculate a resolution level, as shown in FIG. 4a, first, a chordal deviation vector for an edge 420 is generated 400. As shown in FIG. 4b, the chordal deviation vector 424 is created from the midpoint of an edge 420 to the midpoint of a cubic spline 416 representing the surface of the polygon. This cubic spline 416 is taken from the cubic spline information derived from the control mesh as described above. There is one cubic spline 416 for each edge in the original control mesh. This vector 424 thus represents the projection outwards of the edge 420 of a polygon. Next, the vector 324 is projected into screen space to determine a visibility factor for the edge 420 of the polygon. The visibility factor measures the amount of visibility of the edge 420 of the polygon when converted into screen space coordinates. For example, if the polygon represents part of the tip of the nose of a face that is facing the camera, the polygons comprising the tip have a low visibility factor because the curvature of the nose is not apparent when viewed directly. However, if face is turned toward a more profile angle, the visibility factor is high, because the curvature of the nose can be seen very clearly in screen space. To determine the visibility factor of an edge 420, the vector 424 is projected 404 into screen space 428, as shown in FIG. 4c. The length of the vector 424 in screen space 428 represents the amount of visibility of the edge 420 of the polygon when seen by the user. Thus, in a preferred embodiment, a resolution threshold is created to compare lengths of projected vectors against a threshold to determine 412 the amount of resolution to be assigned to the endpoints of the edge 420 defined by the vector 424.

In one embodiment, a resolution threshold is chosen such that if the length of the projected vector does not exceed the threshold, a resolution level of 0, or no subdivision, is assigned to the endpoints of the edge 420 represented by the vector 424. If the length of the projected vector 424 exceeds 1T but is less than 2T (where T is the resolution threshold), then a resolution level of 1 is assigned to the endpoints of the edge 420, indicating that the polygon be subdivided once. If the length of the projected vector 424 exceeds 2T but is less than 3T, a resolution level of 2 is assigned to the endpoints of the edge 420. Finally, in this embodiment, if the length of the projected vector 424 exceeds 3T but is less than 4T, a resolution level of 3 is assigned to the endpoints of the edge 420. Thus, resolution levels can be adaptively determined for individual vertices of a polygon responsive to the visibility of the edge 420 of the polygon when displayed in screen space. Variations on a chosen resolution threshold value and consequent assignments of resolution levels can also be used in accordance with the present invention.

In a preferred embodiment, an endpoint resolution level is generated 414 for all edges for which it is a part. This may provide different resolution levels for an endpoint depending on which polygon it is considered with. In accordance with the present invention, the maximum resolution level for an endpoint of an edge is selected 415 as the resolution level to be used for the endpoint. This ensures that the highest quality appearing object will be generated by the present invention. However, an average of the resolution values or the minimum resolution value (providing faster speed) may also be used in accordance with the present invention.

Figure 6A:
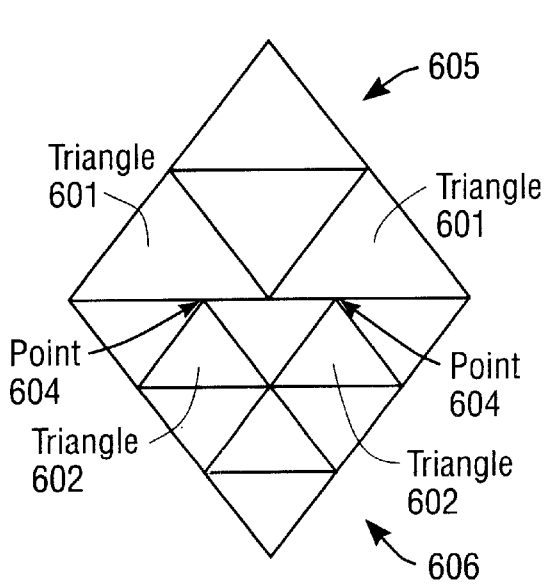
FIGS. 6a and 6c are diagrams illustrating prior art subdivisions

Once resolution levels have been determined for the vertices of the polygons, the polygons are subdivided 112 by the polygon subdivider 112. One important aspect of 3D rendering is that T-vertices generate artifacts that are disconcerting to a user. FIG. 6a illustrates the T-vertex problem. In FIG. 6a, triangle 605 adjacent to triangle 606 creates a T-vertex problem because the bases of triangles 601 of triangle 605 are split by triangles 602 of triangle 606 at points 604. If rendered, this will generate visual artifacts. However, in conventional systems, to address the T-vertex problem, after subdividing, polygons are examined and re-examined to "fix" the T-vertex problems recursively. After one iteration, the subdivided polygons are changed to eliminate any T-vertex artifacts. Then, a second iteration is required to determine if the previous pass has created any new T-vertices and to fix those T-vertex problems. This must be repeatedly performed to eliminate the T-vertices. This is performed in addition to the recursive subdivision, and thus the entire subdivision-to-rendering process of conventional systems requires a great deal of recursive processing.

Figure 5:
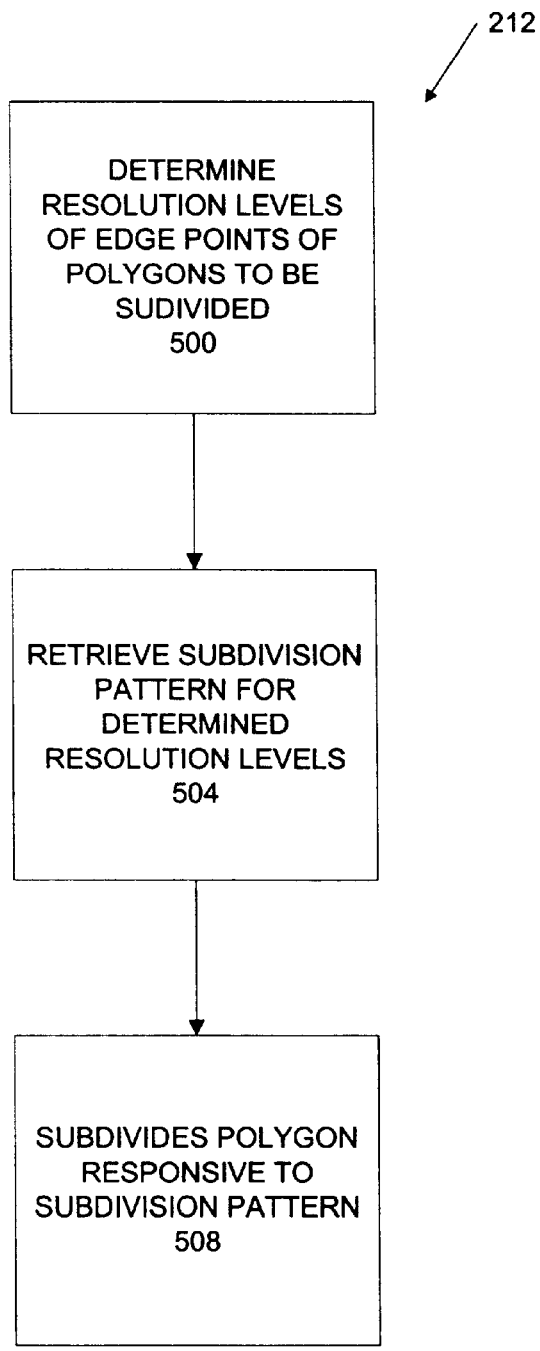
FIG. 5 is a flowchart illustrating a method of subdividing polygons in accordance with the present invention.

However, in accordance with the present invention, a subdivision optimizer 116 is provided to eliminate this recursive processing. In a preferred embodiment, the subdivision optimizer 116 comprises a look-up table stored in memory that maintains the subdivisions for every possible resolution level combination. However, any other data structure for storing information in an organized fashion that can be quickly retrieved may also be used in accordance with the present invention. As shown in FIG. 5, first, the polygon subdivider 112 determines 500 the resolution levels of vertices of a polygon to be subdivided. The resolution level generator 108 preferably has previously determined the resolution levels, however, the resolution levels can be generated from any source. Then, polygon subdivider 112 retrieves 504 a subdivision pattern stored in the subdivision optimizer 116 for the given resolution levels. The subdivision patterns are predesigned to eliminate T-vertex problems, thus eliminating the need to recursively fix T-vertex problems. Then, the polygon subdivider 112 subdivides 508 the polygon responsive to the retrieved subdivision pattern.

FIGS. 8a–8t illustrate one embodiment of predesigned patterns covering all possible subdivisions in a system having four resolution levels (0–3). In the Figures of FIGS. 8a–8t, the vertex numbers of the subdivided triangles created are listed in vertex number boxes next to the subdivided triangle. The vertex numbers are identified in the reference triangle 800 illustrated on each sheet of the drawings. In one embodiment, a representation of the reference triangle 800 is maintained by the subdivider 112 to allow efficient subdivision of a given triangle. The reference triangle 800 specifies all possible vertices of a subdivided triangle. Thus, for example, in FIG. 8f, four subdivided triangles are to be generated. The vertex numbers for the first subdivided triangle 801 are (0,1,5), and as shown in reference triangle 800, those points of the reference triangle 800 can be connected to form triangle 801. The other triangles 802, 803, 804 are computed similarly. Thus, after the subdivision optimizer 116 receives resolution levels of vertices of a polygon to be subdivided, the subdivision optimizer 116 can transmit the vertex numbers of the new polygons to the subdivider 112, and the subdivider can subdivide the polygon by adding the polygons at the locations specified by the vertex numbers with reference to the reference triangle 800. The subdivision optimizer 116 is only required to store the subdivision pattern and the associated vertex numbers of the polygons to be generated, thus minimizing the resources required to implement the subdivision optimizer 116. For example, if the subdivision optimizer is a look-up table, the size of the look-up table is greatly reduced through use of a reference triangle 800.

Figure 6B:
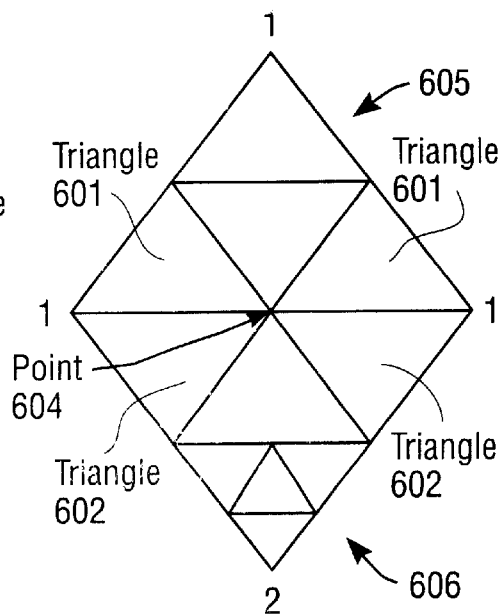
FIGS. 6b and 6d are diagrams illustrating subdivisions in accordance with the present invention.
Figure 6C:
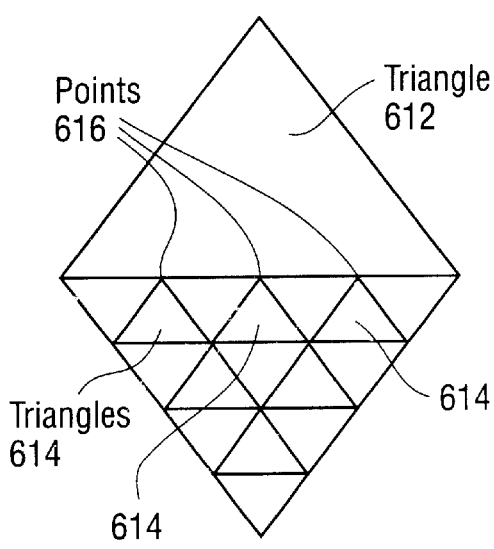
Figure 6D:
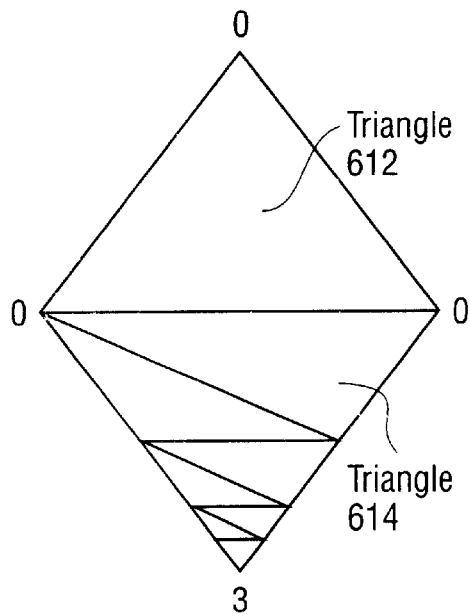

In the embodiment of FIGS. 8a–8t, subdivision patterns for 20 possible combinations of resolution levels are stored. However, as each pattern has three degrees of rotation, all 64 possible cases are addressed by these 20 subdivision patterns. Storing only 20 patterns and providing rotation minimizes storage requirements; however, all 64 patterns could also be maintained in accordance with the present invention. As shown in FIG. 6b, the application of a subdivision pattern, in this case, the pattern of FIG. 8g, eliminates T-vertex problems by generating a subdivided polygon providing the required amount of subdivision without creating T-vertices. In accordance with this subdivision pattern, triangles 601 of triangle 605 are aligned with triangle 602 at point 604, thus eliminating the T-vertex. FIG. 6c illustrates a second T-vertex problem and FIG. 6d illustrates the subdivision pattern that eliminates the T-vertex problem. In FIG. 6c, the base of triangle 612 is split by triangles 614 at points 616. However, in accordance with the predefined subdivision pattern of FIG. 8k, as shown rotated in FIG. 6d, the base of triangle 612 is met with an equally solid base of triangle 614. Thus, in accordance with the present invention, a single iteration is all that is required to generate T-vertex free polygonal combinations, saving processing power, time, and providing a higher quality visual representation. As discussed above, the single iteration methodology also allows the present invention to be implemented as dedicated hardware as the recursive processing of conventional systems is eliminated.

Figure 7:
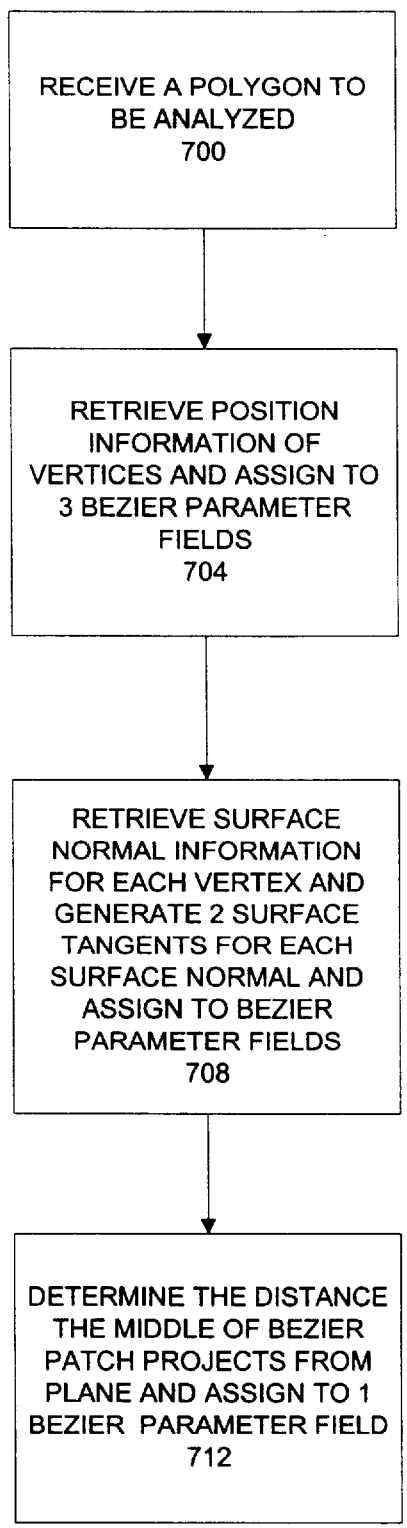
FIG. 7 is a flowchart illustrating reconstructing a curved surface in accordance with the present invention.

After the polygons have been subdivided, a curved surface reconstruction engine 118 receives the polygon information and reconstruction data as well as the vertex information of the new vertices added during subdivision to reconstruct 216 the curved surface with the additional polygons created by the subdivision. FIG. 7 is a flowchart illustrating reconstructing a curved surface in accordance with the present invention. First, a polygon to be analyzed is received 700 by the curved surface reconstruction engine 116. Again, the polygon can be generated from the polygon subdivider 112, or can be generated from a conventional source of polygons to be rendered by a renderer 120. Then, the position information of the vertices of the polygon are retrieved 704. This information was stored, as discussed above, as part of the original polygonal information that accompanied the reconstruction data generated by the reconstruction data generator 104.

Figure 9:
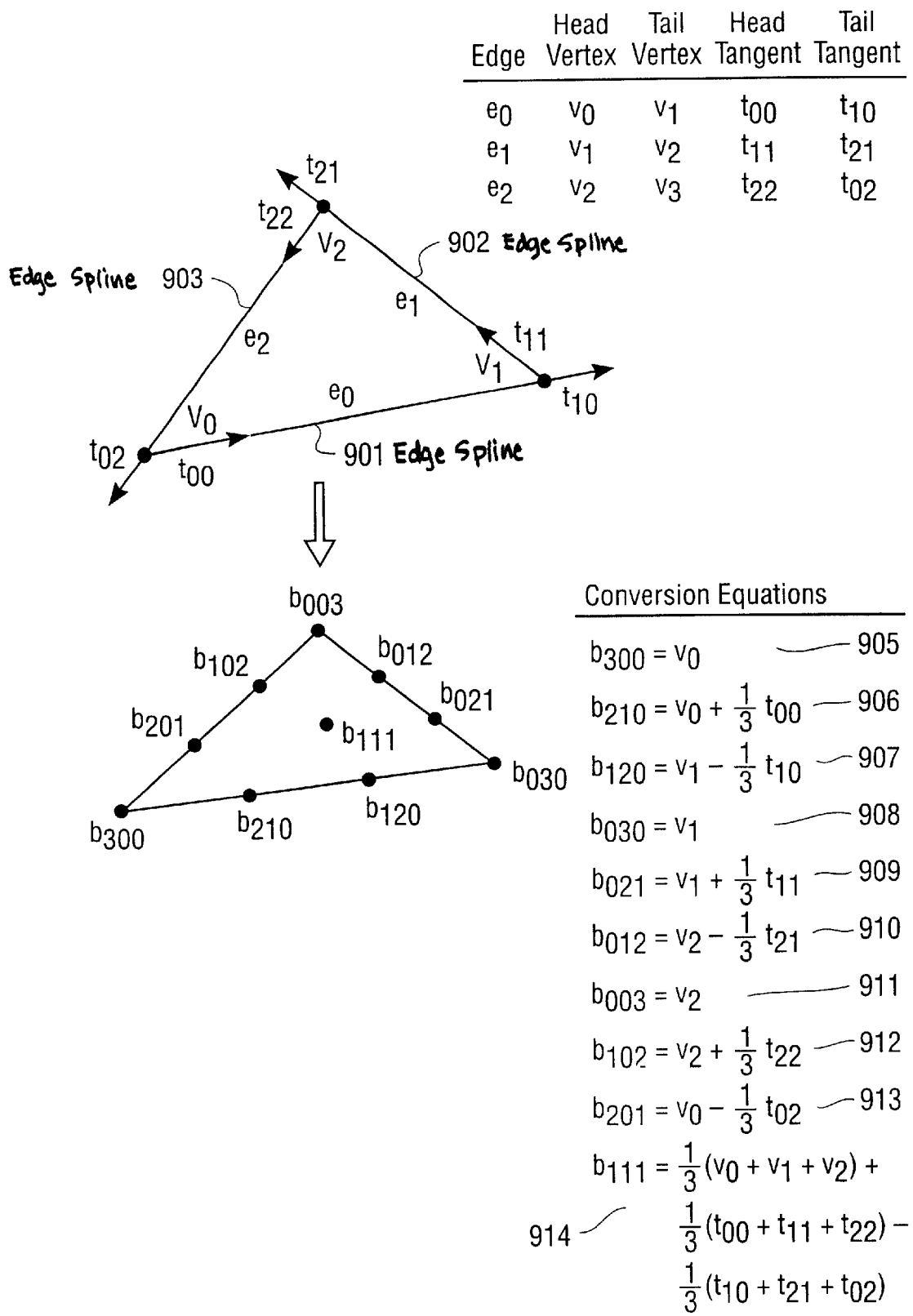
FIG. 9 is an illustration of generating 10 Bezier control parameters from 3 edge splines in accordance with the present invention.

In accordance with the present invention, triangular Bezier patches (bicubic patches) are used to represent the curved surface represented by a polygon to provide a more accurate reconstruction of the surface due to the high flexibility of the Bezier patch. As is known, there are 10 surface parameters (called control points) required to create a bicubic Bezier patch. The Bezier triangle surface parameters are calculated from the edge spline data stored previously during the generation of reconstruction data step. As shown in FIG. 9, a polygon 900 is comprised of 3 edge splines 901, 902, 903. These splines (Hermite) are composed of two vertices, a head vertex and a tail vertex, for which the position information was stored previously. The surface normal data, also stored previously, is used to generate the two tangents at each vertex (discussed below), a head tangent and tail tangent. This information is then used to convert the 3 edge splines 901, 902, 903 into 1 Bezier triangular patch. The equations listed in FIG. 9 are a preferred method of converting edge spline data into Bezier patch data; however other methods known to those of ordinary skill in the art may also be used in accordance with the present invention.

Figure 10:
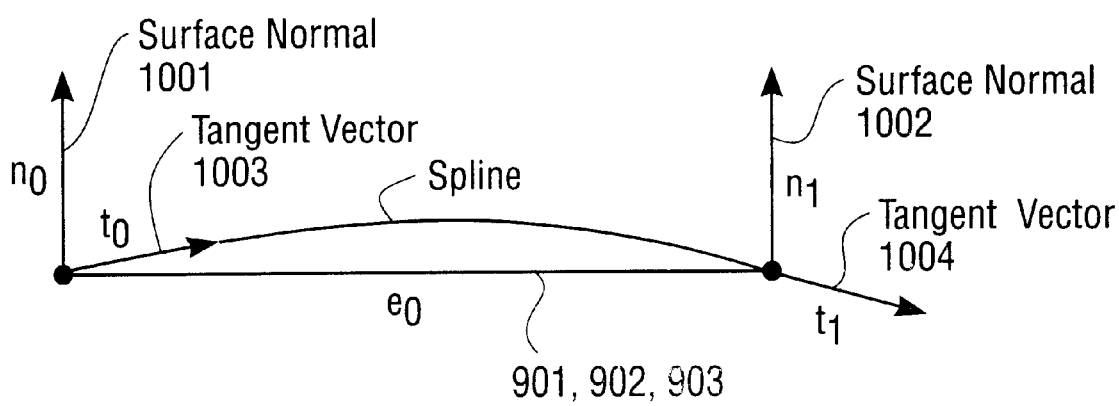
FIG. 10 is an illustration of generating tangent vectors from surface normal data in accordance with the present invention.
Figures 8Q, 8R:
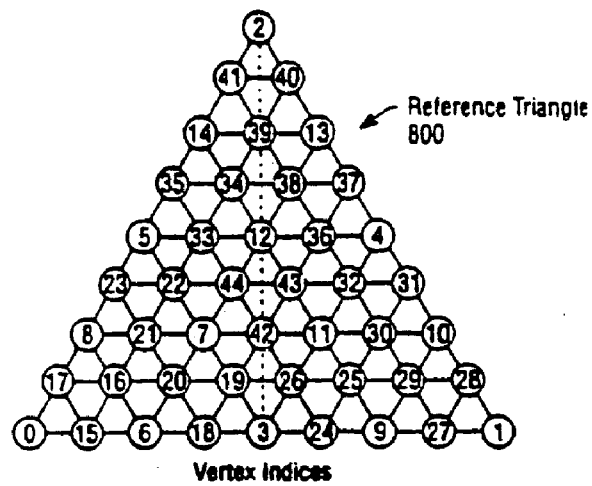
Figures 8S, 8T:
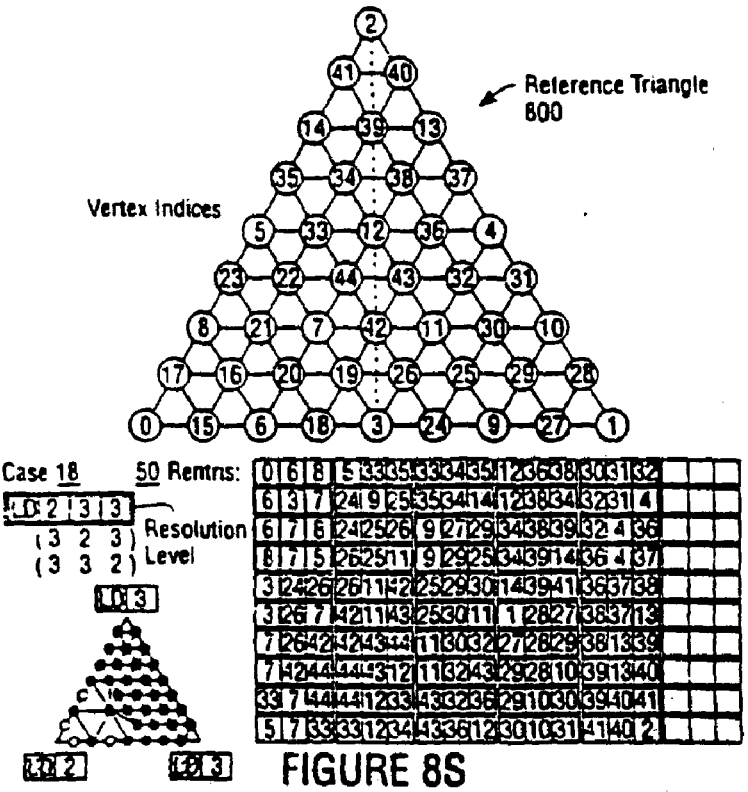
Figure 9:
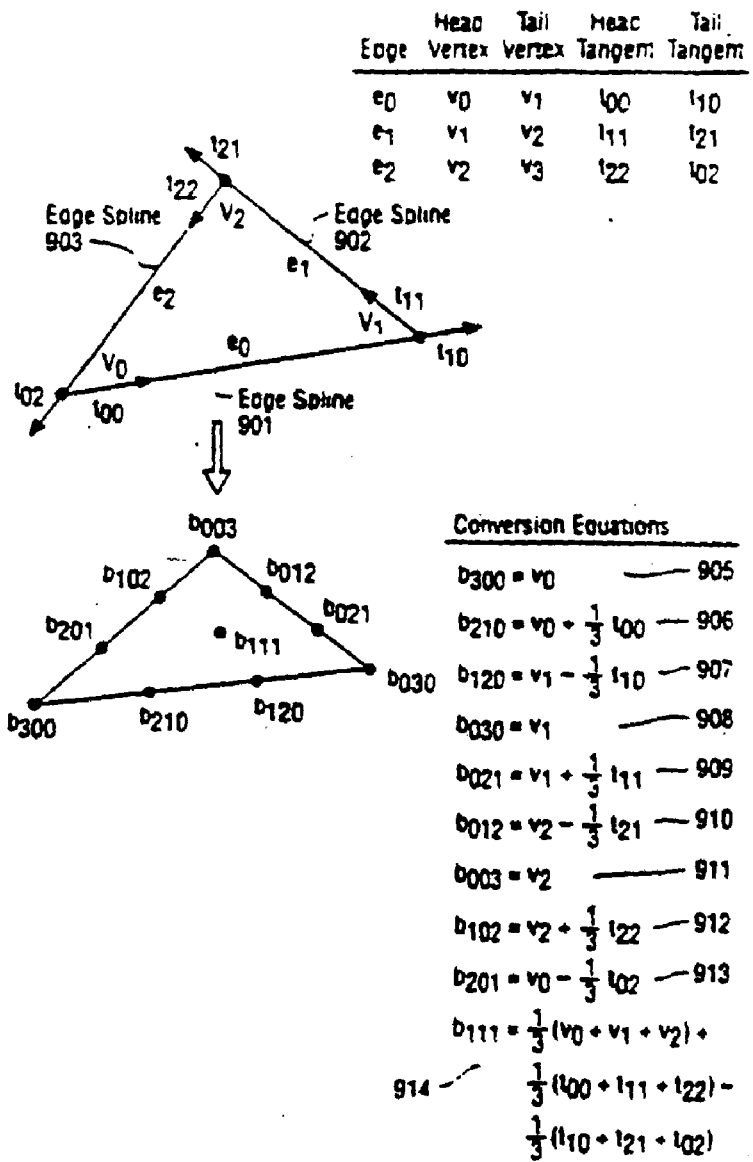

More specifically, first, the position information of the vertices is assigned to the three Bezier parameter fields for storing coordinates of the Bezier patch, as shown in Equations 905, 908, and 911. Next, the surface normal information previously stored as a part of the reconstruction data is retrieved 708 and used to generate 2 surface tangents for each surface normal. As shown in more detail in FIG. 10, the surface normals 1001, 1002 are used to generate tangent vectors 1003, 1004 for each edge 901, 902, 903 of the received polygon. A first tangent vector 1003 is generated responsive to Equation 1005 and a second tangent vector 1004 is generated responsive to Equation 1006, where $t_0$ is the first tangent vector 1003, $t_0$ is the second tangent vector, $n_0$ is the first surface normal at the endpoint of the tail of the edge 901, 902, 903, $n_1$ is the surface normal at the head of the edge 901, 902, 903, the symbol "^" indicates is the conventional normalize operator, which takes a vector of arbitrary length and generates a vector with unit length in the same direction, and $e_0$ is the edge 901, 902, 903 being analyzed. In the preferred embodiment, all of the vectors are computed as 3D vectors. The data for representing the 2 surface tangents for each edge spline 901, 902, 903 are assigned to 2 Bezier parameter fields responsive to equations 906, 907, 909, 910, 912, 913. Next, the distance the Bezier patch will project from the plane containing the endpoints of the patch is computed responsive to equation 914, and assigned to the last Bezier parameter field, giving the last of the 10 Bezier control points. Other equations for converting the vertex, cubic spline, and surface normal information into 10 Bezier control parameters would be considered to be within the scope of the present invention.

To generate a more accurate curved surface representation, the present invention also examines the flags set during the reconstruction data generation. As discussed above, the flags indicate whether the surface to be reconstructed has a sharp point, a hard edge, is continuously smooth, or has other surface qualities. That information allows the generation of a curved surface represented by the Bezier triangle that accurately reflects the surface of the original object. More specifically, the flags are used to control the continuity of neighboring Bezier triangles. If the smooth flag is set, normals are matched across adjacent Bezier triangles. If a sharp edge or point is set, normals are not shared along edges or points across adjacent Bezier triangles, resulting in a sharp edge. The reconstruction data could be used to generate parameters for alternate mathematical representations in accordance with the present invention. Once the Bezier patch for each polygon has been generated, the Bezier patch is evaluated at all new vertices of polygons generated by subdivision, and these new polygons are transmitted to the renderer 120, which then renders the object for display to the user.

Thus, through the additional of the new polygons, detail is added to those parts of the picture that will benefit the most from additional detail, and less detail is applied when more detail would not be visible to a user. This provides maximum picture quality while minimizing resource needs. Additionally, due to the subdivision methodology of the present invention, the reconstructed version of the object may have even more detail than the original representation (if, for example, a polygonal approximation was used as the original surface representation) in accordance with the present invention, thus providing a higher quality reconstructed object than the original object from which the reconstructed object was based.

At run-time, the circuitry of the present invention executes the above-described methodology preferably each time a camera angle shifts, to dynamically add or subtract polygons from the viewed image as appropriate. By implementing the above-described methodology as dedicated integrated circuits, the processing of images at run-time can be accomplished effectively and efficiently. Moreover, due to the use of the subdivision optimizer 116, the time required to process each object is greatly minimized. Accordingly, even those systems implementing the present invention with a general purpose processor can still provide on-the-fly curved surface rendering quickly at run-time.

It is to be understood that the specific mechanisms and techniques that have been described are merely illustrative of one application of the principles of the invention. Numerous additional modifications may be made to the apparatus described above without departing from the true spirit of the invention. Moreover, although specific functionality has been ascribed to different steps of the above described method and modules of the above described circuitry, these functionalities can be performed in different orders and by different modules as would be known to one of ordinary skill in the art.

What is claimed is:

1. A method for generating polygonal approximations of objects, wherein an object is defined by a control mesh specifying vertices of polygons comprising the object, the method comprising the steps of:

receiving the control mesh of an object to be processed;

generating reconstruction data from the control mesh;

adaptively calculating resolution levels for polygons represented by the control mesh to provide detail to polygons responsive to an appearance of the polygons in screen space;

subdividing the polygons represented by the control mesh; and displaying a curved surface for at least one new polygon created by the subdivision responsive to the reconstruction data.

2. The method of claim 1 wherein the reconstruction data includes edge data.

3. The method of claim 1 wherein the reconstruction data includes surface hint data.

4. The method of claim 1 wherein the reconstruction data includes surface normal data.

5. The method of claim 1 wherein the new polygons comprise an approximation of Bezier triangular patches, and parameters for the Bezier triangular patches are generated from the reconstruction data.

6. A method for generating polygonal approximations of objects, wherein an object is defined by a control mesh specifying vertices of polygons comprising the object, the method comprising the steps of:

receiving the control mesh of an object to processed;

adaptively calculating resolution levels for polygons represented by the control mesh responsive to camera angle information to provide detail to polygons responsive to an appearance of the polygons in screen space; and subdividing a polygon responsive to the calculated resolution level.

7. The method of claim 6 wherein adaptively calculating resolution levels further comprises:

projecting a vector representing a chordal deviation of an edge of a polygon of the control mesh into screen space; and determining resolution levels for endpoints of the edge the responsive to a length of the vector representing the edge in screen space.

8. The method of claim 7 wherein determining a resolution level for the polygon further comprises:

comparing a length of the projected vector to a resolution threshold; and responsive to the length of the projected vector not exceeding the threshold, providing no subdivision.

9. The method of claim 7 wherein determining a resolution level further comprises:

responsive to a length of the projected vector exceeding the threshold, subdividing the polygon containing the edge a number of times responsive to the amount by which the length of the projected vector exceeds the threshold.

10. A method for generating polygonal approximations of objects, wherein an object is defined by a control mesh specifying vertices of polygons comprising the object, the method comprising the steps of:

receiving the control mesh of an object to be processed;

calculating resolution levels for polygons represented by the control mesh; and subdividing the polygons represented by the control mesh responsive to subdivision patterns stored in a predefined data structure.

11. The method of claim 10 wherein the subdivision patterns are defined to eliminate visual artifacts.

12. The method of claim 11 wherein the subdivision patterns are defined to eliminate T-vertex artifacts.

13. An apparatus for subdividing polygons of an object to provide greater resolution and eliminate visual artifacts, wherein an object is defined by a control mesh specifying vertices of the polygons comprising the object, the apparatus comprising:

a resolution level generator, coupled to receive the control mesh for calculating resolution levels for polygons represented by the control mesh;

a polygon subdivider, coupled to the output of the resolution level generator and coupled to a subdivision optimizer, for subdividing the polygons represented by the control mesh responsive to subdivision patterns retrieved from the subdivision optimizer; and the subdivision optimizer, coupled to the polygon subdivider, for storing subdivision patterns for subdividing polygons while avoiding generation of visual artifacts.

14. The apparatus of claim 13 wherein the subdivision optimizer is a look-up table maintained in memory.

15. The apparatus of claim 14 wherein the subdivision optimizer stores all possible cases for subdivision for retrieval by the polygon subdivider.

16. The apparatus of claim 14 wherein the subdivision optimizer stores a subset of all possible cases for subdivision, wherein the patterns stored can be rotated to generate the remaining possible cases for subdivision.

17. An apparatus for generating a curved surface for at least one new polygon created by subdivision wherein an object is defined by a control mesh specifying vertices of polygons comprising the object, the apparatus comprising:

a reconstruction data generator, coupled to receive the control mesh, for generating reconstruction data from the control mesh;

a resolution level generator, coupled to receive the control mesh, for calculating resolution levels for polygons represented by the control mesh to provide detail to polygons responsive to an appearance of the polygons in screen space;

a polygon subdivider, for subdividing polygons specified by the control mesh to increase resolution of the object; and a curved surface reconstruction data, coupled to receive polygons from the polygon subdivider, to generate a refined polygonal approximation to a curved surface for at least one new polygon created by the subdivision responsive to the reconstruction data.

18. The apparatus of claim 17, wherein the reconstruction data generator extracts surface normal data for the polygons specified by the control mesh.

19. The apparatus of claim 17, wherein the reconstruction data generator extracts edge data for the polygons specified by the control mesh.

20. The apparatus of claim 17, wherein the reconstruction data generator extracts cubic spline data for the polygons specified by the control mesh.

21. The apparatus of claim 17 wherein the curved surface reconstruction engine generates Bezier patches responsive to the reconstruction data and polygon vertex data to create adaptively refined polygonal approximations to curved surfaces.

22. An apparatus for calculating resolution levels of individual vertices of a polygon to be rendered wherein an object is defined by a control mesh specifying vertices of polygons comprising the object, the apparatus comprising:

a resolution level generator, coupled to receive the control mesh, for analyzing the vertices of the polygons to determine a visibility factor for an edge of a polygon and determining a resolution level responsive to the determined visibility factor.

23. The apparatus of claim 22 wherein the resolution level generator projects a chordal deviation of an edge defined by two vertices of a polygon into screen space to determine the visibility factor.

24. The apparatus of claim 23 wherein the visibility factor is determined by comparing a length of the chordal deviation of an edge in screen space to a predetermined threshold.

\* \* \* \* \*

UNITED STATES PATENT AND TRADEMARK OFFICE
CERTIFICATE OF CORRECTION

PATENT NO.     : 6,462,738 B1
DATED          : October 8, 2002
INVENTOR(S)    : Kato It is certified that error appears in the above-identified patent and that said Letters Patent is hereby corrected as shown below:

<u>Title page, Item [54] and Column 1, line 1,</u>
Replace the title "CURVED SURFACE RECONSTRUCTION" with -- CURVED SURFACE RECONSTRUCTION WITH SUBDIVISION PATTERNS AND ADAPTIVE RESOLUTION --.

Signed and Sealed this

Fourth Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,462,738 B1
DATED         : October 8, 2002
INVENTOR(S)   : Kato It is certified that error appears in the above-identified patent and that said Letters Patent is hereby corrected as shown below:

<u>Title page, Item [54] and Column 1, line 1,</u>
Replace the title "CURVED SURFACE RECONSTRUCTION" with -- CURVED SURFACE RECONSTRUCTION WITH SUBDIVISION PATTERNS AND ADAPTIVE RESOLUTION --.

<u>Drawings,</u>
Delete Drawing Sheets 10, 17, 18 and 19 and substitute therefore attached Drawing Sheets 10, 17, 18 and 19.

This certificate supersedes Certificate of Correction issued March 4, 2003.

Signed and Sealed this

Twentieth Day of May, 2003

JAMES E. ROGAN
*Director of the United States Patent and Trademark Office*

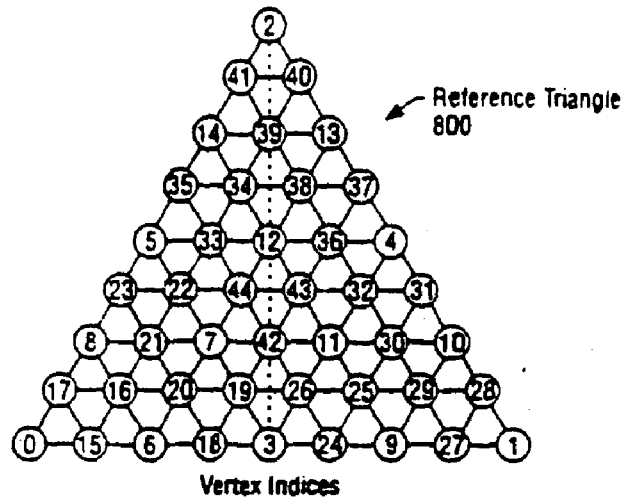
Vertex Indices — Reference Triangle 800
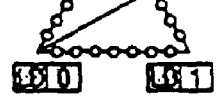
FIGURE 8C
FIGURE 8D